United States Patent
Massieu

(10) Patent No.: US 7,296,749 B2
(45) Date of Patent: Nov. 20, 2007

(54) AUTOFOCUS BARCODE SCANNER AND THE LIKE EMPLOYING MICRO-FLUIDIC LENS

(75) Inventor: Jean-Louis Massieu, Montauban (FR)

(73) Assignee: Intermec IP Corp., Everett, WA (US)

(*) Notice: Subject to any disclaimer, the term of this patent is extended or adjusted under 35 U.S.C. 154(b) by 229 days.

(21) Appl. No.: 11/040,485

(22) Filed: Jan. 20, 2005

(65) Prior Publication Data
US 2005/0218231 A1 Oct. 6, 2005

Related U.S. Application Data

(60) Provisional application No. 60/538,868, filed on Jan. 23, 2004.

(51) Int. Cl.
*G03B 3/10* (2006.01)
(52) U.S. Cl. .................. 235/462.23; 235/462.22; 235/454
(58) Field of Classification Search ........... 235/462.23, 235/462.22, 455; 359/228, 358, 665
See application file for complete search history.

(56) References Cited

U.S. PATENT DOCUMENTS

| | | | | |
|---|---|---|---|---|
| 5,574,598 | A | 11/1996 | Koumura et al. | 359/666 |
| 5,640,001 | A | 6/1997 | Danielson et al. | 235/472 |
| 5,783,811 | A * | 7/1998 | Feng et al. | 235/462.42 |
| 5,864,128 | A * | 1/1999 | Plesko | 235/462.35 |
| 6,316,781 | B1 * | 11/2001 | Nagle et al. | 250/573 |
| 6,369,954 | B1 | 4/2002 | Berge et al. | 359/666 |
| 6,894,652 | B2 * | 5/2005 | Rawnick et al. | 343/753 |
| 6,976,629 | B2 * | 12/2005 | Carlson | 235/462.11 |
| 7,038,856 | B2 * | 5/2006 | Quake et al. | 359/661 |
| 2001/0002033 | A1 | 5/2001 | Winarski et al. | 235/383 |

FOREIGN PATENT DOCUMENTS

JP 7-105305 4/1995

OTHER PUBLICATIONS

Berge, B., et al., "Variable Focal Lens Controlled by an External Voltage: An Application of Electrowetting," *The European Physical Journal E*, 3:159-163, 2000.
Chern, N., et al., "Practical Issues in Pixel-Based Autofocusing for Machine Vision," in *Proceedings of the 2001 IEEE International Conference on Robotics and Automation*, Seoul, Korea, May 21-26, 2001, pp. 2791-2796.
Love, G., "Adaptive Optical Components Using Liquid Crystal Devices," *Journal of the Communications Research Laboratory*, 46(3):427-430, Nov. 1999.
Keren, D., et al., "Restoring Subsampled Color Images," *Machine Vision and Applications*, 11:197-202, 1999.

(Continued)

*Primary Examiner*—Ahshik Kim
(74) *Attorney, Agent, or Firm*—Seed IP Law Group PLLC

(57) ABSTRACT

A machine-readable symbol reader includes a microfluidic lens assembly providing responsive, reliable auto-focus functionality. A range finder may provide distance to a planar target (e.g., barcode symbol) information for use in auto-focusing, with or without localization. Illumination system, if included, is selectively controlled based on the distance to target and auto-focusing functionality to substantially reduce power consumption. The localization may color optical sensors.

43 Claims, 14 Drawing Sheets
(2 of 14 Drawing Sheet(s) Filed in Color)

OTHER PUBLICATIONS

Marino, B., et al., "Improving the Performance of Single Chip Image Capture Devices," *Journal of Electronic Imaging*, 12(2):209-218, Apr. 2003.

Ramanath, R., et al., "Demosaicking Methods for Bayer Color Arrays," *Journal of Electronic Imaging*, 11(3):306-315, Jul. 2002.

Schechner, Y., et al., "The Optimal Axial Interval in Estimating Depth From Defocus," *Proceedings of the International Conference on Computer Vision*, Kerkyra, 1999, pp. 834-838.

Subbarao, M., et al., "The Optimal Focus Measure for Passive Autofocusing and Depth-From-Focus," SPIE, vol. 2598, pp. 89-99.

Subbarao, M., et al., "Focusing Techniques," in *Proceedings of the OE/Technology SPIE Conference*, Boston, MA, Nov. 1992.

Vdovin, G., "Fast Focusing of Imaging Optics Using Micromachined Adaptive Mirrors," Apr. 1997, URL=http://guernsey.et.tudelft.nl/focus/, download date Jun. 21, 2005.

Wei, T-C, "Three Dimensional Machine Vision Using Image Defocus," dissertation, State University Of New York, 1994.

\* cited by examiner

AUTOFOCUS BARCODE SCANNER AND THE LIKE EMPLOYING MICRO-FLUIDIC LENS

CROSS-REFERENCE TO RELATED APPLICATION

This application claims the benefit under 35 U.S.C. § 119(e) of U.S. Provisional Patent Application No. 60/538,868 filed Jan. 23, 2004, where this provisional application is incorporated herein by reference in its entirety.

BACKGROUND OF THE INVENTION

1. Field of the Invention

This disclosure generally relates to optoelectronic reading devices for acquiring images of machine-readable symbols, such as bar code, area code, matrix or stacked code symbols, and particularly to providing autofocus capability in such devices.

2. Description of the Related Art

Optoelectronic readers for reading bar codes and other machine-readable symbols fall into two general groups: 1) moving beam devices commonly referred to as scanners (e.g., laser scanners), and 2) fixed beam devices commonly referred to as imagers (e.g., CCD imagers). Each group has its own relative advantages.

Moving beam devices typically move or scan a light across a target. For example, a scanner may employ a laser diode and a mechanism for moving a laser beam across the target. While it may be possible to move the light source itself, scanners typically employ one or more rotating or oscillating mirrors which reflect the laser beam, sweeping back and forth across a target, thereby sequentially illuminating portions of the target along a scan line. Scanners also typically include an electro-optical sensor, such as one or more photodiodes, that detects the laser light reflected from the target and produces a corresponding analog signal. The scanner may employ a standard lens or retro-collector to focus the reflected light on the electro-optical sensor. Typically, the scanner, or an associated device, converts the analog signal to a digital signal before decoding the digital signal according to standard decoding schemes.

While fixed beam devices may rely on ambient light, most imagers employ an illumination system. The illumination system typically includes a number of high-intensity light-emitting diodes (LEDs) arranged to simultaneously flood the entire target with light. Imagers strive for uniform illumination over the entire target. Imagers also include an electro-optical sensor (e.g., one- or two-dimensional CCD arrays), and may include a lens system to focus reflected light onto the sensor. A CCD array may be electronically sampled or scanned, to produce a digital signal suitable for decoding. Imagers eliminate moving parts, and allow high reading speeds at relatively low cost.

Many machine-readable symbol readers employ a fixed focus lens. A typical design distributes approximately one thousand pixels of a sensor over a 100 mm field-of-view at ~150 mm, achieving a maximum barcode resolution of 0.1 mm per bars (Nyquist limit). Yet in many applications, the reader must provide a relatively large tolerance with respect to the distance between the target and the lens. To increase tolerance, the ratio of the image distance to the aperture lens diameter for finite-conjugate situation or the ratio of the focal length to the aperture lens diameter for an object at infinity ("f-number") is increased as much as possible. The increase is limited by the minimum illumination required by the sensor, and ultimately the pupil diffraction blurring.

To compensate for the consequent reduction in reflected light (i.e., in inverse proportion to the square of the f-number), barcode readers typically include a larger number of, and/or higher intensity, light sources than would otherwise be required. For example, some barcode readers employ red LEDs to achieve a higher intensity output per watt. Most readers with red illumination also employ a 'black and white' sensor without a mosaic filter on top of the photosensitive matrix of pixels, since green and blue pixels are blind to red illumination. With a Bayer filter (FIG. 4), the cut-off frequency for red radiation is two times lower than for a 'white and black' sensor, and the modulation transfer function is higher at the aliasing frequency (See Modulation Transfer Function in Optical and Electro-Optical Systems, D. Boreman, SPIE press).

Thus, while a high f-number allows large depth-of-field (i.e., with a lens focused at hyperfocal distance), as a practical matter the range of illumination restricts operation to short distances (e.g., below 1 meter) to maintain a sufficient signal-to-noise ratio. Additionally, while fixed focus barcode readers are cost effective, they are highly specialized devices, typically having a short range and limited to monochromatic uses, and thus incompatible with many other imaging applications.

While some machine-readable symbol readers provide an auto-focus functionality, such devices typically rely on changing the internal spacing of one or more of the elements of a lens system along the optical axis to achieve variation of the focal length. Moving lens systems disadvantageously require relatively large and precise mechanical lenses, tracks, linkages and drives. Moving lens systems are also rather slow in responding, making such systems impractical for most automatic "on-fly" barcode reading.

Other attempts have been made at providing auto-focus capability in barcode readers. For example, a designed proposed by U.S. Pat. No. 5,574,598 (Nippondenso) employs an elastic change of the curvature of a transparent fluid-filled lens. A design proposed by Vdovin, et. al. "Micromachined mirror with a variable focal distance in Free-Space Microoptical Systems", Digest of EOS Topical Meeting, pp. 28-29, Apr. 1-3 1996 employs electrostatic deformation of the curvature of a mirror. A design proposed in U.S. Pat. No. 6,464,363 (Nishioka et. al.) employs an electrostatic mirror. Finally, a design proposed in U.S. Pat. No. 6,347,742 (Winarski et. al.) employs a variable focal length liquid crystal lens. Such compact adaptive lenses rely on the rotation of the liquid crystal under an electric field that produces a change of refraction index. Liquid crystals have slow response times and exhibit polarization dependence. Additionally, the thickness of the crystal film reduces the optical transmission, limiting the auto-focus range. The transmission is further reduced if unpolarized light is or when two orthogonally aligned liquid crystal lenses are used. Principles of liquid crystal lenses are further described in "Adaptive Optical Components Using Liquid Crystal Devices", G. D. Love, Journal of the Communications Research Laboratory, Vol. 46 No. 3, November 1999, pp. 427-430.

There is a need for a reliable, responsive auto-focus system in machine-readable symbol readers such as barcode readers, that eliminates mechanical elements.

BRIEF SUMMARY OF THE INVENTION

In one aspect, a machine-readable symbol reader to read machine-readable symbols carried by targets, the machine-readable symbol reader comprises a microfluidic lens assembly having at least one fluid and a number of electrodes selectively operable to modify a shape of the at least one fluid; an optical sensor positioned along an optical axis of the microfluidic lens assembly relatively behind the microfluidic lens assembly with respect to the target; and at least one controller, the controller coupled to cause a selected potential to be applied to at least some of the electrodes of the microfluidic lens assembly to focus images of the target on the optical sensor. The machine-readable symbol reader may also comprise a range finder system positioned to assess a distance between the microfluidic lens assembly and the target, wherein the at least one controller is coupled to receive range finding information from the range finder system and configured adjust a focal length of the microfluidic lens assembly based on the range finding information. The machine-readable symbol reader may further comprise an illumination system comprising a number of illumination sources, where the controller is configured to determine a desired intensity of illumination and coupled to selectively activated a number of the illumination sources to produce desired intensity of illumination. The machine-readable symbol reader may even further comprises a Bayer color filter assembly positioned between the target and the optical sensor.

In another aspect, a method of operating a machine-readable symbol reader to read machine-readable symbols carried by targets comprises determining a distance between a microfluidic lens assembly of the machine readable symbol reader and the target; adjusting a focal length of the microfluidic lens assembly based on the determined distance to the target; capturing an image of a machine-readable symbol carried by the target; and decoding the machine-readable symbol carried by the target. The method may further comprise adjusting an output intensity of an illumination system of the machine-readable symbol reader based on at least one of the determined distance between the microfluidic lens assembly and the target and the focal length of the microfluidic lens assembly.

In a further aspect, a method of operating a machine-readable symbol reader to read color encoded machine-readable symbols carried by targets comprises: acquiring an image through a three color filter at a single optical sensor; determining a plurality of sub-windows of the image on which to operate; for each of the colors, determining a subtraction-modulus-difference value for each of a number pixels in horizontally adjacent ones of the sub-windows and for each of a number pixels in vertically adjacent ones of the sub-windows; accumulating the subtraction-modulus-difference value for each of at least three different colors; aggregating adjacent sub-windows having accumulated subtraction-modulus-difference values below a defined threshold into a meta window of the image on which to operate; determining a focus value corresponding to a focus condition at an initial focal length of the microfluidic lens assembly; adjusting the microfluidic lens assembly to a second focal length; determining a focus value corresponding to a focus condition at the second focal length of the microfluidic lens assembly; determining a direction of change in the determined focus values; repeatedly, adjusting the microfluidic lens assembly at different incremental focal lengths in a space of the image along the same direction in the space, and determining a focus value corresponding to a focus condition at the different incremental focal lengths until the focus value drops by more than a defined threshold; and interpolating a best focus length from at least three of the focal lengths.

Eliminating mechanical elements from the auto-focus assembly, may provide a responsive (i.e., quick) and/or reliable auto-focus system that provides a wide spatial resolution range ("focus adaptiveness") for a machine-readable symbol reader. Focus adaptiveness, eliminates depth-of-field as a critical issue, thus, allowing the f-number to be significantly reduced. The best resolution of the lens is not achieved for a fixed best focus distance, but rather can be tuned between short and far field (cut-off frequency $f=1/(\lambda*f\text{-number})$). The system may reduce or eliminate the need for illumination, reducing the overall cost of the reader, as well as reducing operating cost, and/or extending operating time between charging for battery operated readers.

Because the sensor illumination increases in direct proportionality to the square of the f-number, the illumination system may be eliminated or at least reduced. If illumination is still required, for example, for dark environments, the illumination power can be closed-loop controlled along with the electronic gain and/or the integration time of the sensor, as part of an automatic gain strategy. In most cases, ambient illumination provides enough illumination to significantly enhance autonomy for mobile applications.

The auto-focus system may also be compatible with color image sensors, allowing polychromatic operation. Ambient light and most barcode contrasts are polychromatic, so color sensors can be used without loss of spatial resolution. More generally, auto-focus permits barcode applications to coexist with other color image applications having variable object distances.

BRIEF DESCRIPTION OF THE SEVERAL VIEWS OF THE DRAWINGS

The patent or application file contains at least one drawing executed in color. Copies of the patent or patent application publication with color drawings will be provided by the Office upon request and payment of the necessary fee.

FIG. 10 is a top plan view of a Bayer filter element according to another illustrated embodiment.

FIG. 11 is schematic illustration of an number of sub-windows mapped to a Bayer color filter array.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with optoelectronic reading devices including light sources, lens, optical sensors, processors, memories, and communications devices have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including but not limited to." The headings provided herein are for convenience only and do not interpret the scope or meaning of the claimed invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

Figure 1:
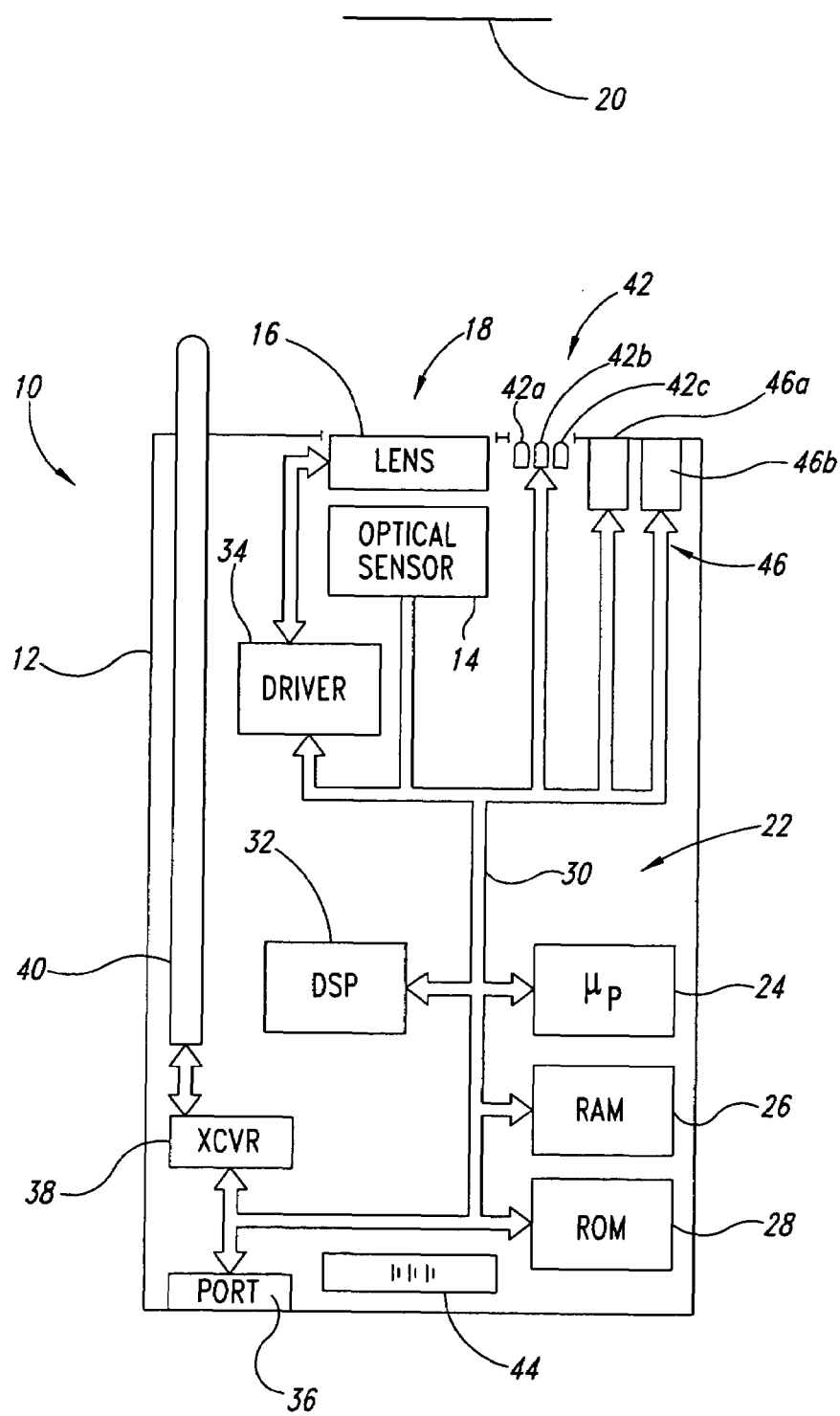
FIG. 1 is a functional block diagram of a machine-readable symbol reader employing a micro-fluidic lens assembly positioned to read a machine-readable symbol carried by a target, according to one illustrated embodiment.

FIG. 1 shows a machine-readable symbol reader 10 including a housing 12 and various electronics and optoelectronics useful in automatic data collection (ADC), according to one illustrated embodiment. The machine-readable symbol reader 10 includes an optical sensor 14 and a microfluidic (e.g., electrowetted, electrophoresis) lens assembly 16 positioned with respect to an aperture 18 in the housing 12 to form images of a target 20 (i.e., machine-readable symbol) on the optical sensor 14. The target 20 may be a machine readable symbol formed of one or more symbol characters selected from any of a variety of symbologies, for example, Code 39, Code 93i, UPC/EAN, etc.

The machine-readable symbol reader 10 also includes a control system 22 including a microprocessor 24, random access memory (RAM) 26 and read-only memory (ROM) 28 coupled by a bus 30. The microprocessor 24 executes instructions stored in RAM 26 and/or ROM 28 to control the microfluidic lens assembly 16, process information from the optical sensor 14 and carry out various other functions. The microprocessor 24 may take any of a variety of commercially available microprocessors such as Pentium II, III or IV, or PxA250 all available from Intel, or may take the form a dedicated processor such as an application specific integrated circuit (ASIC). The control system 22 may also include one or more additional processors, for example, a digital signal processor (DSP) 32 that may be dedicated to performing certain functions, for example, performing analog-to-digital conversion and/or otherwise decoding information collected by the optical sensor 14. The control system 22 may additionally include one or more dedicated drivers 34 for driving the microfluidic lens assembly 16, as discussed below.

The machine-readable symbol reader 10 may include input and/or output systems such a communications port 36 for providing wired communications (i.e., hardwired) or wireless communications (e.g., infrared). The machine-readable symbol reader 10 may additionally, or alternatively include a radio 38 (i.e., transceiver, receiver, and/or transmitter) and associated antenna(s) 40 for providing wireless communications such as radio frequency (RF) communications.

The machine-readable symbol reader 10 may further include an illumination system 42 including one or more illumination sources 42a-42c such as light emitting diodes (LEDs) for providing flood illumination to the target 20. The microprocessor 24 may control the illumination system 42, for example, via the bus 30. The illumination system 42, as well as other components of the machine-readable symbol reader 10 may receive power via the power source 44 which may, for example, take the form of one or more batteries, battery pack, or fuel cell. The power source 44 may be coupled to the various components of the machine-readable symbol reader 10 via the bus 30 or via a dedicated power bus (not shown).

In some embodiments, the machine-readable symbol reader 10 may include an auto-focus system comprising the microfluidic lens assembly 16, driver 34, and optionally the microprocessor 24 or optionally DSP 32. The auto-focus system may improve the ergonomics of "aim and read" hand-held devices by extending the depth-of-field and spatial resolution. The auto-focus system may rely on active and/or passive range finding, as discussed in more detail below. In particular, the machine-readable symbol reader 10 may rely solely on active range finding, or solely on passive range finding, or may rely on a combination of active and passive range finding. For example, the machine-readable symbol reader 10 may use active range finding to coarsely adjust focus such as for initially acquiring a target 20, and may use passive range finding to finely adjust focus once the target 20 is in with the depth-of-field of the microfluidic lens assembly 16. Thus, the combination of active and passive range finding permits the focusing on a few contrasted or low textured targets 20.

The machine-readable symbol reader 10 may, for example, implement active range finding via an active range finding system 46, which may comprise an output range finding device 46a and an input range finding device 46b.

The active range finding system 46 may employ a form of electromagnetic radiation to assess the distance from the machine-readable symbol reader 10 to the target 20. For example, the output range finding device 46a may take the form of a light source, such as a laser diode, LED or other directional light source, while the input range finding device 46*b* may take the form an optical sensor such as a photodiode, Vidicon or other photosensitive device for detecting light reflected from the target 20. The frequency of the emitted light may be outside that typically perceptible by humans, for example, the frequency may lie within the infrared range of frequencies. Other examples of range finding devices 46*a*, 46*b* that employ electromagnetic radiation may include those that emit and receive frequencies above or below those frequencies typically denominated as "light" such as radar or microwave radiation.

Alternatively, the active range finding system 46 may employ a form of acoustical energy (e.g., sound, sonar) to assess the distance from the machine-readable symbol reader 10 to the target 20. For example, the output range finding device 46*a* can take the form of a speaker or other transducer for emitting pressure waves, while input range finding device 46*b* may take the form of a microphone for detecting such pressure waves reflected from the target 20. The pressure waves may be outside that typically perceptible by humans (i.e., human hearing range), for example, the pressure waves may lie in the ultra-frequency range.

The microprocessor 24, DSP 32 or other processor may process signals from the range finding input device 46*b* to determine the distance between the reader 10 and the target 20, allowing the microprocessor 24, DSP 32, or other processor to adjust the microfluidic lens assembly 16 accordingly. The microprocessor 24 or other processor may employ any of variety of approaches in determining distance. For example, the microprocessor 24 or other processor may measure the time between emitting the electromagnetic radiation or pressure waves and receiving electromagnetic radiation or pressure waves reflected from the target 20. Additionally or alternatively, the microprocessor 24 or other processor may employ a frequency or phase shift between the emitted electromagnetic radiation or pressure waves and the returned electromagnetic radiation or pressure waves, such as a Doppler shift. Other methods will be apparent to those of skill in the art from the above teachings.

Alternatively, or additionally, the machine-readable symbol reader 10 may implement passive range finding, using image analysis to measure a degree of sharpness, for example, via the DSP 32 and/or microprocessor 24. Passive range finding is particularly economical where, as in the present case, the machine-readable symbol reader 10 already includes means for image analysis such as the DSP 32 and/or suitably programmed microprocessor 24.

The machine-readable symbol reader 10 may implement the passive range finding by incrementally changing the focal length until the image gradually comes into focus. Alternatively, or additionally, the DSP 32 or microprocessor 24 may execute a depth-from-defocus algorithm to directly determine an estimate of the defocus and to determine the change in focal length to correct the defocus. A variety of focus metrics techniques from the field of machine vision may be suitable. Focus metrics algorithms are typically executed in the spatial domain, which may be faster than via Fast Fourier transforms. Some typical focus metrics algorithms measure either the energy of the image (e.g., gray sale variance), the high pass frequency content (e.g., image gradient, image Laplacian), the histogram entropy or local variation, and/or sum-modulus-difference. While the above focus metrics parameters each present a maximum value at best focus, the techniques differ with respect to performance, monotonicity, robustness to noise and computational cost. A discussion of some suitable focus metrics techniques and/or algorithms may be found in Chem et al., *Practical Issues In Pixel-Based Autofocusing for Machine Vision*, Proceedings of the 2001 IEEE International Conference on Robotics and Automation, Seoul, Korea, May 21-26, pp 2791-2796.

As described in detail herein, a fast, real time, implementation of an auto-focus technique including symbol localization (i.e., detection of target 20 or symbol in image) may be achieved via a sum-modulus-difference or Variance technique, that is easily implemented with specific hardware, that does not use multiplication, and that efficiently detects one- and/or two-dimensional symbols in an image.

The use of the auto-focus system may provide a number of distinct and unexpected advantages when, for example, reading one- and two-dimensional machine-readable symbols such as barcodes, and particularly when capturing color images which requires white light (e.g., variety of wavelengths). In typical applications, the available levels of ambient white light suggest, and may even require, the use of a relatively low f-number (f#) to achieve a minimum acceptable signal-to-noise (S/N) ratio (e.g., use of f2.5 rather than f8 for current barcode readers). However, reducing the f# typically produces a linear reduction in depth-of-field, which is disadvantageous in most real-world applications.

One possible solution to the reduced depth-of-field is the use of auto-focusing. However, until now the inability to provide a responsive (i.e., fast or quick) auto-focus capability has hindered the development of successful user-friendly auto-focus hand-held machine-readable symbol readers.

The auto-focus system described herein, whether active, passive or a combination of active and passive, may alleviate the problem presented by reduced depth-of-field, particularly in light of the responsiveness that may be obtained using the microfluidic lens assembly 16 described herein. For example, where the optical sensor 14 (e.g., one- or two-dimensional CMOS/CDD matrix sensor) has a relatively small format (e.g., approximately ⅔ inches or less), and a correspondingly short focal length, it becomes possible to obtain a relatively fast optic (e.g., approximately f2.5 or less) with a limited pupil diameter (e.g., approximately 0.5 mm or less). In such a situation, the microfluidic lens assembly 16 may quickly adjust from near to far focus, for example, on the order of approximately 20 ms. Thus, this approach provides a substantial benefit over conventional mechanical auto-focus systems which are typically too unresponsive (i.e., slow) for such use.

Additionally, or alternatively, the auto-focus system may allow use of alternative illumination sources 42*a*-42*c*, which may reduce the parts count and/or weight, increase longevity and/or reliability, and/or reduce manufacturing and/or maintenance costs. For example, phosphorus covered LEDs may be capable of producing a white spectrum of sufficient intensity to serve as the illumination source 42*a*-42*c* when the machine-readable symbol reader 10 employs the auto-focus system and microfluidic lens assembly 16.

Figure 2:
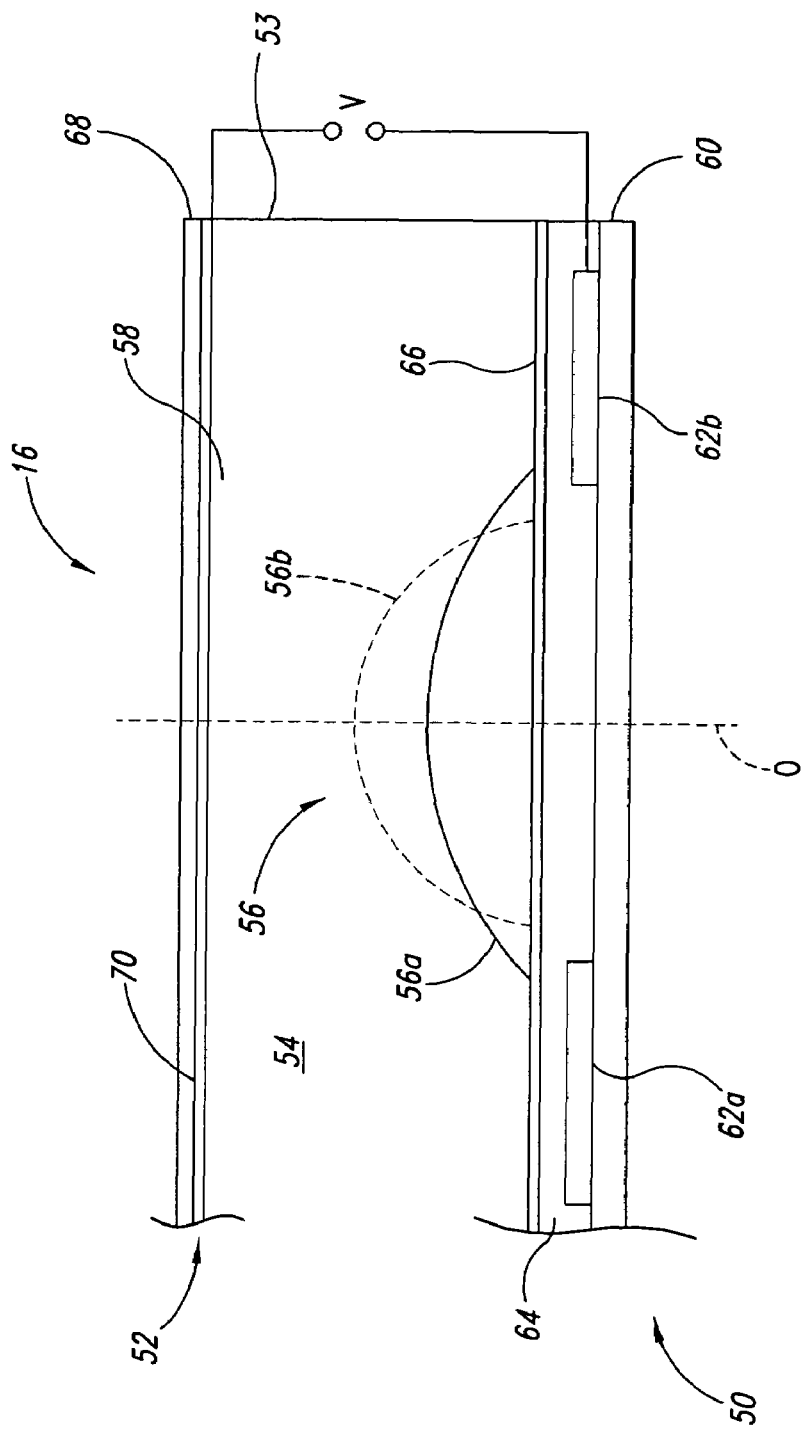
FIG. 2 is cross-sectional view of the micro-fluidic lens assembly of the machine-readable symbol reader of FIG. 1, according to one illustrated embodiment.

FIG. 2 shows the microfluidic lens assembly 16, according to one illustrated embodiment. The microfluidic lens assembly 16 comprises a first plate 50 and a second plate 52 spaced from the first plate 50 to form a cavity 54 therebetween. The cavity 54 may be further delimited by side walls 53. The cavity 54 receives a first fluid 56 and a second fluid 58 where the first and second fluids 56, 58 are immiscible with respect to one another, have different optical indexes, and preferably are of substantially same density.

The first plate 50 may be formed from a substrate 60, a number of electrodes 62*a*, 62*b* carried by the substrate 60, a dielectric layer 64 overlying the electrodes 62*a*, 62*b*, and a hydrophobic or electrowetting layer 66 overlying the dielectric layer 64. Preferably, the entire first plate 50 is transparent although in some embodiments only a portion of the first plate 50 is transparent. Thus, suitable materials for the substrate 60 may include glass; while suitable materials for the electrodes 62 may include transparent indium tin oxide (ITO). The hydrophobic layer 66 may employ a fluoropolymer such as Teflon commercially available from E.I. du Pont de Nemours and Company. Employing multiple electrodes 62 may assist in retaining the first fluid 56 at rest, centered with respect to a desired location on the hydrophobic layer 66 and with respect to the optical sensor 14. In some embodiments, the first plate 50 may include one or more additional layers, for example, sodium barrier films. Some embodiments may eliminate the discrete hydrophobic layer 66 where the material selected for the dielectric layer 64 has sufficient electrowetting characteristics to serve as both a hydrophobic layer and a dielectric layer.

The second plate may be formed from a substrate 68 and an electrode 70. Preferably, the entire second plate 52 is transparent, although in some embodiments only a portion of the second plate 52 is transparent. In some embodiments, the second plate 52 may be formed from more than two layers, while in other embodiments the second plate 52 may be formed from a single layer. A suitable material for substrate 68 of the second plate 52 may be glass while a suitable material for the electrode 70 may be ITO.

As illustrated in FIG. 2, a voltage V may be applied between the electrodes 62a, 62b on the first plate 50 and the electrode 70 on the second plate 52. This may permit a first potential to be applied to the first fluid 56 and a second potential to the second fluid 58. The microprocessor 24 or other processor may control the application of the potentials, for example, via the driver 34. The difference in potentials or voltage V between the first and second fluids 56, 58 determines the shape of interface between the first and the second fluids 56, 58 under the general principals of electrowetting or electrophoresis. Thus, the microprocessor 24 may controlling the potentials or voltage V to change shape of the first fluid 56, for example, from the shape illustrated by the solid line 56a in FIG. 2 to the shape illustrated by the broken line 56b in FIG. 2. The first fluid serves as a lens, the shape being adjustable to focus an image of the target 20 onto the optical sensor 16 (FIG. 1). The image of the target 20 is projected along an optical axis O. While illustrated as a straight line, the optical axis may have a number of bends, turns or other deviations where the machine-readable symbol reader 10 employs additional optical components such as mirrors, reflectors, prisms, etc. Some of the general principals of electrowetting as applied to lenses are described in "Electrocapillarite et mouillage de films isolants par l'eau" Berge, C. R. Acad. Sci. Paris, serial II, pp. 157-163.

Image sensors are typically grayscale devices that produce an output signal responsive to an intensity of light, from full black to white. In order to detect color, a layer of color filters is bonded to the silicon image sensors using a photolithography process that applies color dyes. Typically, each pixel of an RGB (Red, Green, Blue) imager includes three image sensors with corresponding color filters. Typically, the RGB imager also includes an optical prism and as optics capable of directing incoming light to the three different color sensors. Each image sensor produces red, green and blue digital samples.

A new approach simplifies the imager's optics such that only one image sensor is needed instead of three. This approach uses color filter arrays (CFAs) in order to capture RGB images. CFAs assign a separate primary color to each discrete sensor element of the optical sensor 14 (FIG. 1) by locating a filter of a particular color over the corresponding element. Numerous types of CFAs have been developed for different applications, but the most popular CFA is the Bayer pattern.

Figure 3:
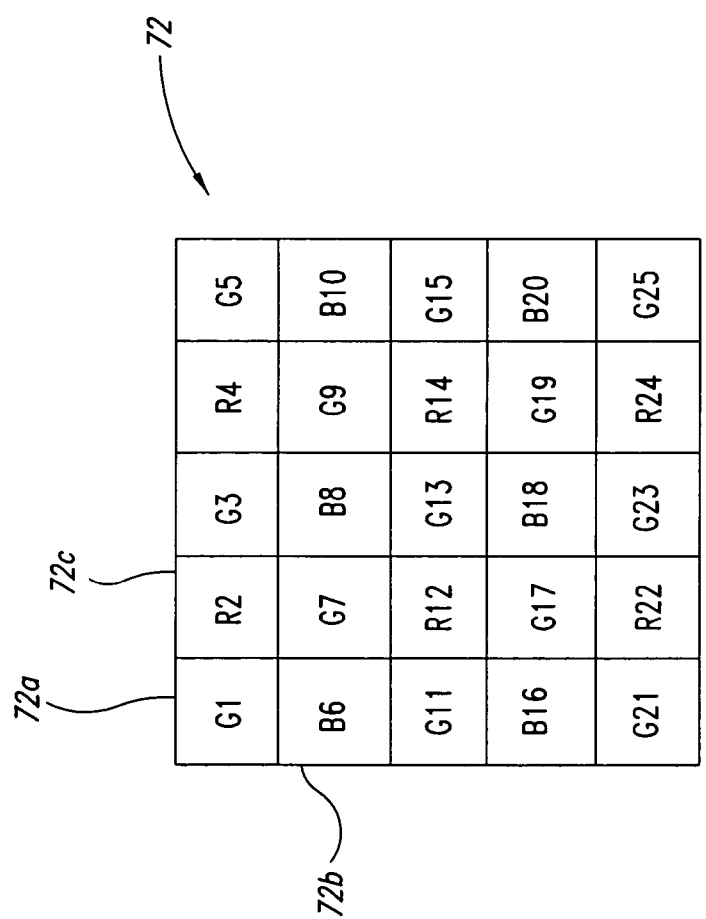
FIG. 3 is top plan view of a Bayer filter for use with a color imaging machine-readable symbol reader, according to one illustrated embodiment.

FIG. 3 illustrates an exemplary Bayer color filter array 72, for use with the machine-readable symbol reader 10, according to one illustrated embodiment. The Bayer color filter array 72 employs a checkerboard pattern, with alternating rows of green filters 72a, blue filters 72b and red filters 72c, as illustrated in FIG. 3. The pattern of the Bayer color filter array 72 has twice as many green filters 72a, as blue filters 72b or red filters 72c, taking advantage of the human physiological tendency to see green luminance as the strongest influence in defining image quality. In use, the Bayer filter array 72 may be positioned between the microfluidic lens assembly 16 and the optical sensor 14.

Thus, as discussed in detail above, a machine-readable symbol reader 10 employs a microfluidic lens assembly 16, providing a responsiveness that enables auto focus during 'on fly' machine-readable symbol (e.g., barcode) reading. The auto focus functionality permits the machine-readable symbol reader 10 to eliminate or reduce the amount of illumination required; thereby reducing parts counts, complexity, and operating costs, while increasing the operating time between recharging or replacement of the power source. The elimination of moving parts also avoids wear and tear, which may significantly increase the operating lifetime of the machine-readable symbol reader 10. The microfluidic lens assembly 16 also allows the miniaturization of the machine-readable symbol reader, and is particularly suitable for mass manufacturing. Also, the low f-numbers achievable with the microfluidic lens assembly 16 permits the use of a CFA such as a Bayer color filter array, allowing detection of color machine-readable symbols. Further, the above described approach may be compatible with other imaging applications, where object distances vary from short to infinity (outdoor scene capture, document tracking, etc.).

Figure 4:
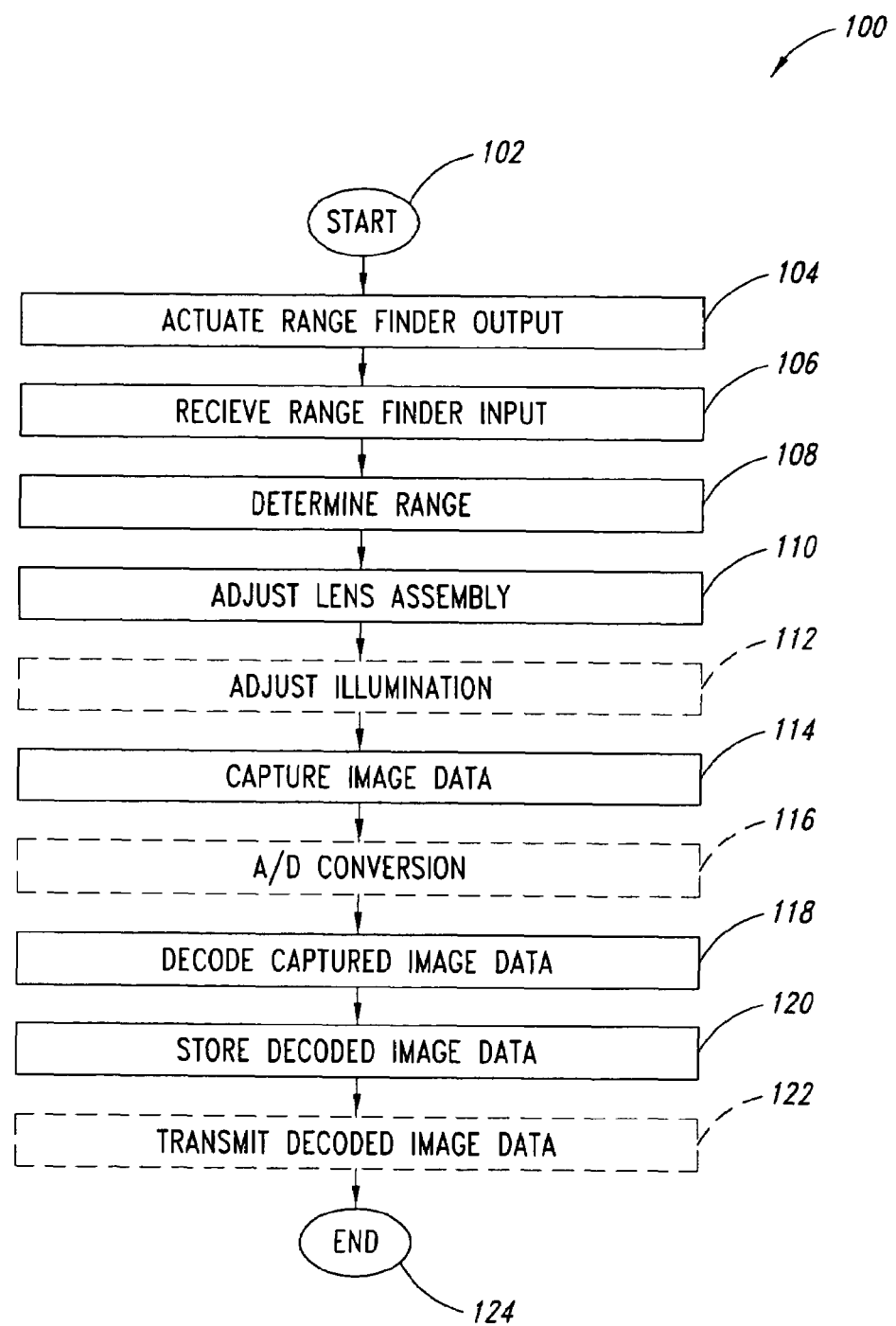
FIG. 4 is a flow diagram of a method of operating the machine-readable symbol reader of FIG. 1, according to one illustrated embodiment.

FIG. 4 illustrates a method 100 of operating the machine-readable symbol reader 10 according to one illustrated embodiment, starting at 102.

At 104, the microprocessor 24 or other processor actuates the active range finding system 46, for example by causing the range finder output device 46a to emit electromagnetic radiation or a pressure pulse. At 106, the microprocessor 24 or other processor receives the range finder input from the range finder input device 46b. At 108, the microprocessor 24 or other processor determines the distance between the target 20 and a portion of the machine-readable symbol reader 10, for example the microfluidic lens assembly 16. For example, by the microprocessor may determine a duration or a frequency or phase shift between the sent and received range finder signals (e.g., electromagnetic energy or pressure pulses).

At 110, the microprocessor 24 or other processor adjusts the microfluidic lens assembly 16 based on the determined range. A knowledge of the range allows the microprocessor 24 or other processor to apply appropriate signals to the electrodes 62, 70 (FIG. 2) to adjust the shape of the first fluid 56 in order to focus the image of the target 20 on the optical sensor 14. For example, the microprocessor 24 may cause the driver 34 to apply a first potential to the electrodes 62 and a second potential to the electrode 70. One of the potential may be a ground potential. The driver 34 may employ a variety of schemes for addressing the electrodes including an active matrix addressing scheme where the electrodes are associated with individual transistors (not shown).

Optionally, at 112, the microprocessor 24 or other processor adjusts the illumination provided to the target 20 by the illumination system 42. For example, the microprocessor 24 or other processor may select a number of illumination devices 42a-42c that will be activated. Adjustment of the illumination allows the microprocessor 24 to minimize the power consumption of the machine-readable symbol reader 10, prolonging use between recharging or replenishment of the power source 44. The adjustment of the illumination may occur before the adjustment of the lens assembly.

At 114, the optical sensor 14 and/or processor 24, 32 captures image data. Optionally, at 116, the captured image data is converted from analog to digital form, for example via an A/D converter or via the DSP 32.

At 118, the microprocessor 24 or DSP 32 decodes the captured image data. Numerous methods of decoding image data are known within the automatic data collection arts. Some methods are discussed in Palmer, Roger C., The Bar Code Book, Third Edition, Helmer Publishing.

At 120, the microprocessor 24 may store the decoded image data, for example in the RAM 26. Optionally, the microprocessor 24 may additionally, or alternatively, transmit the decoded image data at 122. The microprocessor 24 may employ the communications port 36 and/or the transceiver 38 along with antenna 12 to transmit the decoded image data over any communications channel. The method 100 terminates at 124.

As alluded to above, the auto-focusing may be advantageously combined with symbol localization, for example, via a sum-modulus-difference (SMD) technique described with reference to FIGS. 5 and 6, as follows.

Figure 5:
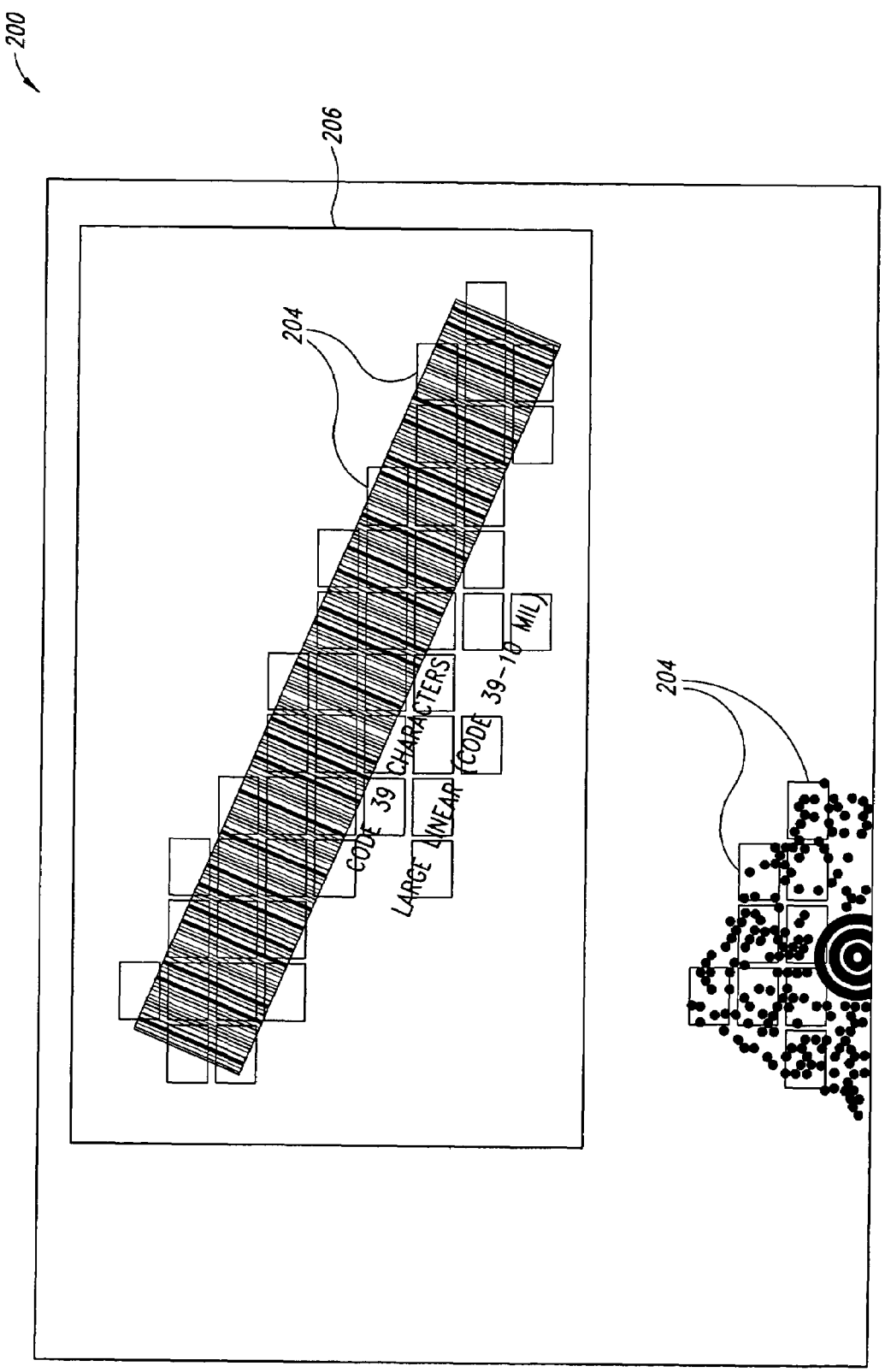
FIG. 5 is a schematic diagram of an image of a machine-readable symbol, the image being divided into sub-windows and a meta-window, illustrated by phantom lines.

FIG. 5 shows an image 200 acquired by the machine-readable symbol reader 10, the image 200 including a machine-readable symbol 202. The image 200 is divided into a matrix of elementary sub-windows 204 (only four sub-windows called out in FIG. 5). The dimensions of each sub-window 204 are dependent on the particular application, but may be a multiple of 2 for ease of computation. For each sub-window 204, the DSP 32 and/or microprocessor 24 performs a Sum-Modulus-Difference operation between horizontal (X-direction) and vertical (Y-direction) neighboring pixels. For example,

[1 0 –1] for the X direction; and $$\begin{bmatrix} 1 \\ 0 \\ -1 \end{bmatrix}$$

for the Y direction

Adjacent sub-windows 204 having close SMD values are aggregated into a meta window 206. In a simplified approach, the meta window 206 is selected for further auto-focus processing according to the SMD value weighted by its distance to the center of the image 200. However, other application criteria (e.g., type of machine-readable symbology or code, resolution, contrast) may be used to select the meta window 206 depending on the particular application. This division, selection and aggregation process may be repeated at each acquisition of an image 200.

Figure 6A:
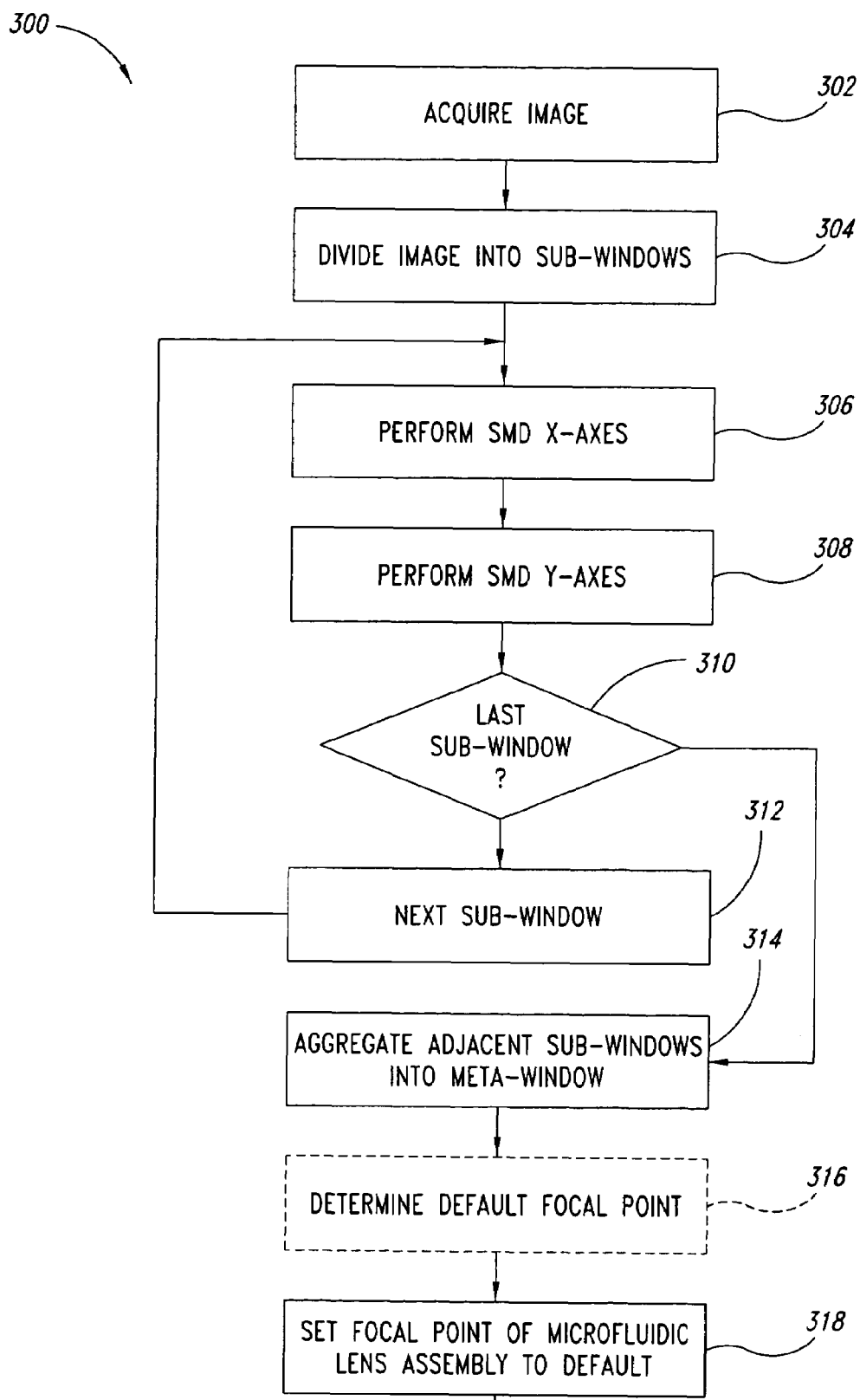
FIGS. 6A and 6B are a flow diagram of a method of range finding employing localization to focus on a target symbol in an image such as that of FIG. 5.
Figure 6B:
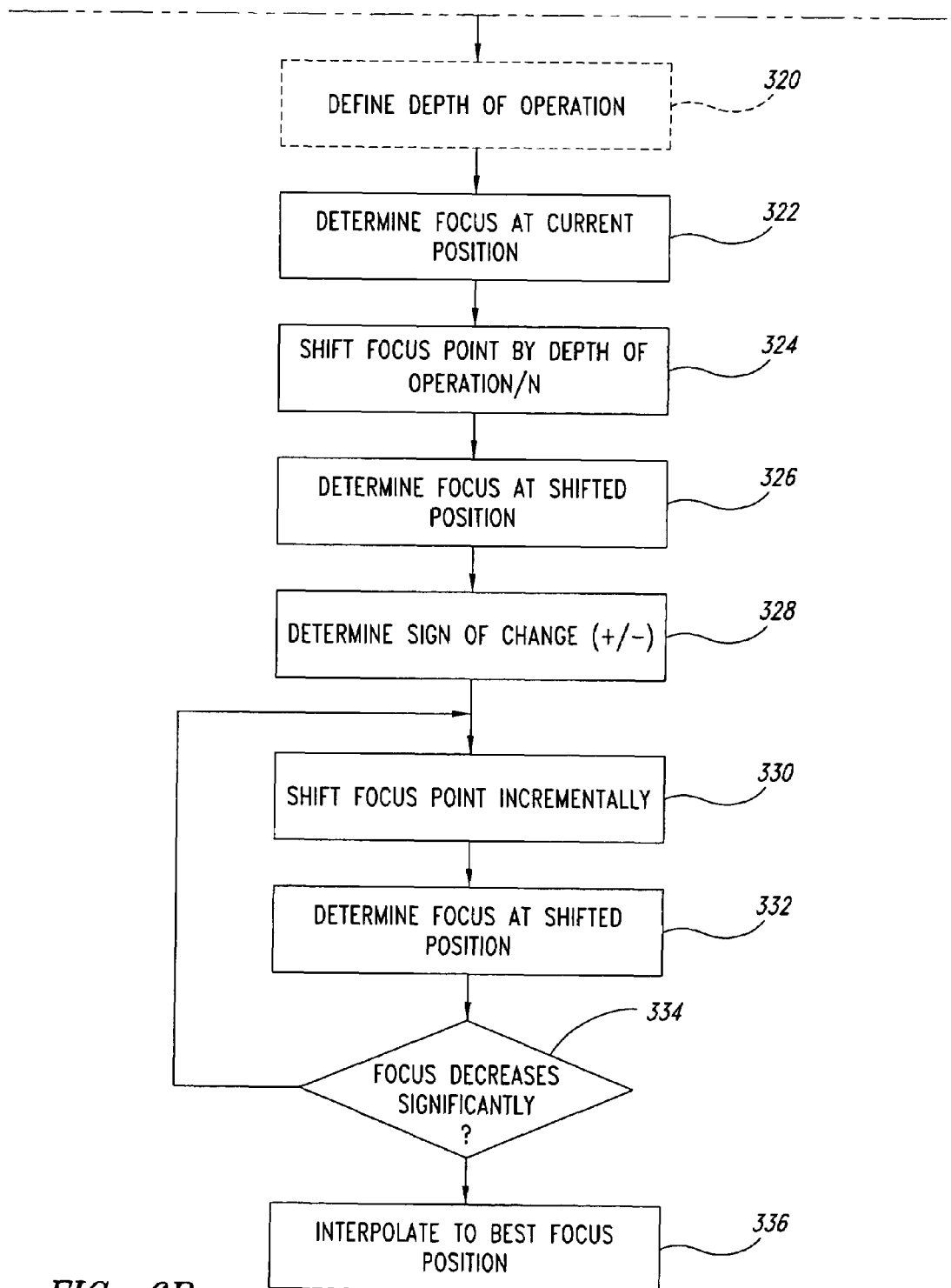

FIGS. 6A and 6B shows a method of localization 300 that the DSP 32 and/or microprocessor 24 may execute in addition to, or as a substitute for acts 104-108 of the method 100 of FIG. 4.

At 302, the optical sensor 14 acquires the image 200 (FIG. 5). At 304, the DSP 32 and/or microprocessor 24 (FIG. 1) divides the image 200 into sub-windows 204 (FIG. 5). At 306, the DSP 32 and/or microprocessor 24 performs an SMD operation along the X-axis, and at 308 performs an SMD operation along the Y-axis. At 310, the DSP 32 and/or microprocessor 24 determines whether the last sub-window 204 has been processed, selecting the next sub-window 204 at 312 and returning to 306 and 308 until the SMD processing of the sub-windows 204 is complete.

At 314, the DSP 32 and/or microprocessor 24 aggregates adjacent sub-windows 204 having close SMD values into the meta window 206. Optionally, at 316, the DSP 32 and/or microprocessor 24 determines default focal length. The default value may be fixed, or may be derived from a history of focus through a heuristic algorithm (e.g. last successful decode or average of last number of successful decodes). Alternatively, the default focal length may be predetermined. At 318, the DSP 32 and/or microprocessor 24 sets the focal point of the microfluidic lens assembly 16 to the default focal length via the driver 34.

Figure 7:
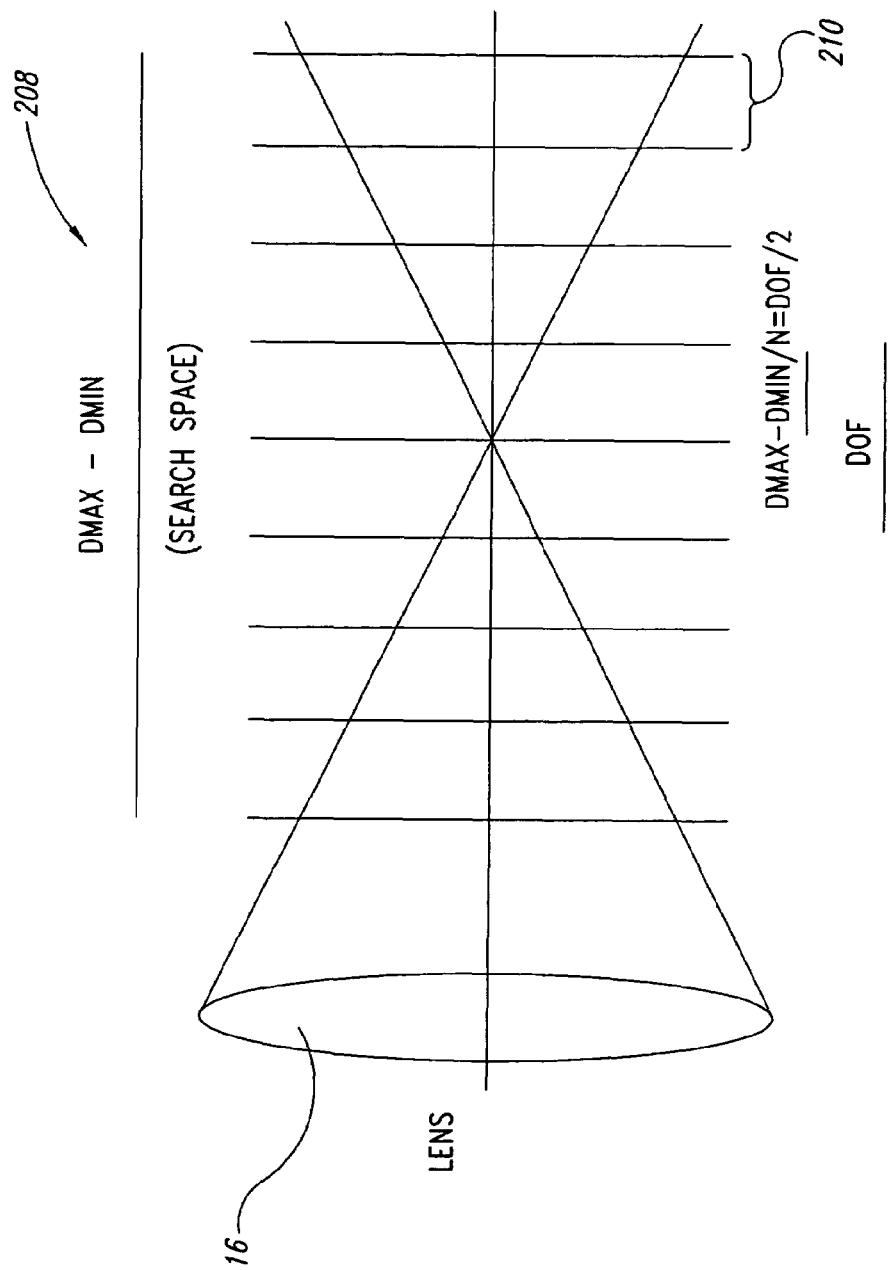
FIG. 7 is a schematic illustration of a search space and a number of incremental focal points for the microfluidic lens assembly useful in explaining the method of FIGS. 6A and 6B.

Optionally, at 320 the DSP 32 and/or microprocessor 24 may determine a depth of operation or search space $[d_{min}, d_{max}]$ 208, as illustrated in FIG. 7. At 322, the DSP 32 and/or microprocessor 24 determine a value representing the focus at the current focal length or position. The DSP 32 and/or microprocessor 24 determines and shifts the focal length or position of the focal point by an incremental distance 210 equal to approximately $[d_{min}, d_{max}]/n$. The incremental distance 210 may be fixed to approximately half the depth of focus, as illustrated in FIG. 7. The DSP 32 and/or microprocessor 24 again determine a value representing the focus, and use the sign of the change in focus to determine the sign of later operations, as discussed immediately below.

The DSP 32 and/or microprocessor 24 apply incremental changes in focal length in a same direction based on the determined sign, until the first significant decrease in the measure of focus occurs. The DSP 32 and/or microprocessor 24 employs interpolation to determine the best focus length, for example, applying a quadratic or a Gaussian fit to three or more points apart the best focus. This interpolation technique minimizes overshooting near the focused focal length. This technique compares favorably to auto-focus algorithms described by M. Subbarao, *Proceeding of SPIE's International Symposium*, Videometrics IV, Vol. 2598, pp 89-99. In particular, the above described techniques, may minimize the incremental change of the focus due to the responsiveness (i.e., short response time) of the microfluidic lens assembly 16 and may avoid preliminary sequential and binary searches.

Combining symbol localization and focus control as described above, enhances the speed at which one- or two-dimensional symbols may be focused, as compared to conventional systems which may focus on objects that are meaningless to the particular application. The method permits selective focusing of the microfluidic lens assembly 16 on the object most likely to be the one-or two-dimensional symbol. Additionally, the meta window XY coordinates may be used to trim the power of an optical zoom, if any (i.e., aim-and-read operations) and/or a transmission channel when using a relatively large sensor matrix. The above methods are particularly suited to fast real-time operations.

The above approach may be employed, with modifications, to operate with color optical sensors 14. Cost effective color optical sensors 14 typically employ a color filter array. Each pixel of the optical sensor 14 samples the intensity of just one of color, for example, one of three colors such as Red, Green, and Blue (i.e., RGB). Usually, this process of color sub-sampling in a single chip system degrades the resulting image data by introducing artifacts, such as blurry edges and/or false coloring. Various de-mosaic algorithms have been developed to address these artifacts. The de-mosaic algorithms typically fill in missing color values by more or less complicated interpolation and correlations rules between each channel (e.g., R, G, B). Some de-mosaic algorithms are discussed in Keren, *Restoring Sub-sampled Color Images*, Machine Vision and Applications (1999), or Marino, *Improving the Performance of Single Chip Image Capture Devices*, Journal of Electronic Imaging 12(2), 209-218 (April 2003).

Each of the RGB pixels detects the modulation of the symbol with a different gain. An approach, set out below, avoids the cost associated with implementation of de-mosaic algorithms by using the raw data without, or before, applying a de-mosaic algorithm. For each sub-window 204, the DSP 32 and/or microprocessor 24 determines the focus for each of the RGB channels. DSP 32 and/or microprocessor 24 determine an accumulated $SMD_A$ for the focus metrics. The DSP 32 and/or microprocessor 24 may determine the accumulated $SMD_A$ for each sub-window by adding each SMD carried out separately for each of the RGB colors (e.g., $SMD_A=SMD_R+SMD_G+SMD_B$). The focus measurement in each channel is monotonic and maximum at best focus for each RGB channel, as is also true for the accumulated $SMD_A$.

A machine-readable symbol 202 (FIG. 5) with a missing primary color in the resulting irradiance spectrum will not be detected by the corresponding RGB channel, and the resulting channel SMD will be zero. Inversely, if the variance of each RGB channel is above respective defined thresholds, the irradiance spectrum of the symbol must overlap the spectral sensitivity of the optical sensor 14. In such a situation, the machine-readable symbol reader 10 may exploit the resolution of the optical sensor 14 up to the Nyquist frequency of the optical sensor 14, if the normalization coefficient is known and applied to each channel response. Using one- or two-dimensional machine-readable symbols 202 (FIG. 5) encoding data in two-level luminance width varying elements simplifies the problem, since the normalization results in having the same average variance for each RGB colors. Once a symbol area is delimited, the gain of each RGB channel may be normalized in inverse proportion of the variance measured in the symbol area. The three RGB channels may be combined, and accordingly weighted, without loss of resolution, and may be used to again measure the focus SMD at full sensor resolution, enhancing the accuracy of the auto focus. The machine-readable symbol reader 10 may also use the normalization to enhance the resolution of the decoding of the machine-readable symbol 202 (FIG. 5).

Thus, the method and apparatus taught herein may employ subtraction-modulus-difference values as the focus metrics, calculated in a matrix of sub-windows that divide the image. The sub-windows may be aggregated into one or more meta-windows according to their position and focus values, which are likely to contain the one- or two-dimensional machine-readable symbol. This permits the method and apparatus to select a meta window as a zone of interest to apply decoding algorithms and/or auto-focus algorithms. The method and apparatus taught herein may also continuously attempt to decode while auto-focusing. Further, the method and apparatus taught herein may normalize the RGB response from the RGB variance calculated over a part of the one- or two-dimensional machine-readable symbol, if the variance is above a given threshold. While the method and apparatus taught herein may employ variance measurement instead of subtraction-modulus-difference, such disadvantageously requires multiplication operations.

1. Focus Control Overview

As discussed generally above, in one embodiment, the auto-focus method is entirely passive, taking advantage of the high modulation and characteristic form factors of the machine-readable symbols used as targets 20. The principle is to look first for a symbol at incremental focus distances, and then to proceed to a fine focus by maximizing the image calculated on the corresponding reduced portion of the overall image. The fast focus actuation allows a reduction or elimination of wear on parts, a reduction in current draw, and silent operation. The auto-focus can be carried out back and forth over the full range of operation as a default coarse focus mode.

The sampling increment of the focus distance is preferably limited to half of the depth-of-field. Once a machine-readable symbol has been localized, a fine focus quadratic interpolation may be applied to finely focus the microfluidic lens assembly 16. By conditioning the auto-focus system to initial localization of machine-readable symbols, the decoding application can applied sooner with to more meaningful portions of the image.

2. AF Algorithm

In one simple hardware/software implementation, the same Sum Modulus Difference (SMD) operator is used to both 1) detect a machine-readable symbol in an image; and 2) to measure the focus of the machine-readable symbol.

At the beginning, the focus is adjusted step-by-step, while the SMD is calculated in elementary sub-windows 204 dividing the image. Then SMD values for the different colors (e.g., $SMD_R$, $SMD_G$, $SMD_B$) are added to produce an image mapped with SMD values.

The elementary sub-windows 204 are the aggregated, if adjacent and having close SMD values. If a resulting area fulfills acceptance conditions, maximizing the average SMD calculated over this area carries out fine auto-focus function.

Thus, it is when one or more machine-readable symbols are localized, that the focus is accurately tuned, and the detected zone of interest is transferred for decoding. The result is a shorter reading response time.

Advance delimitation of a machine-readable symbol can also be used to tune the magnification of an analog zoom, particularly useful for aim-and-read hand-held type machine-readable symbol readers 10.

An exemplary algorithm is as follows:

```
reset reading success, break, symbol localized
get image
do until reading success or break
   Search mode
      do until symbol localized
         focus=focus+Δfocus modulus (dmin–dmax)
         get image
         search for symbol
         if symbol then set symbol localized
      end do until
   Focus mode
      do while symbol localized
         transfer zone of interest
         focus measurement
         update focus
         get image
         search for symbol
         If not symbol then reset symbol localized
      end do until
```

3. Distribution of the Focus Increment over the Reading Distance

The reading distance is defined as $[d_{min}, d_{max}]$. The depth-of-field is defined as the axial displacement that the object may experience before the resultant image blur becomes excessive.

The focus is changed via a periodic voltage applied across the two non-miscible and different index liquids comprising the microfluidic lens assembly 16. Varying the amplitude and/or the frequency of the voltage modifies the curvature of the liquid interface and thus the focus, according to a function f(z) that can be modeled or calibrated.

At the beginning of the reading attempt, the focus of the microfluidic lens assembly 16 is setup at a predefined value or at a value issued from a heuristic algorithm (e.g., last successful decoding).

Then a search for a machine-readable symbol is performed at the current focus position. If none is found, then the focus is shifted to another position by an amount equal or smaller than half the minimum depth-of-field. The depth-of-field at the sensor Nyquist frequency is always minimum at near field. The process is repeated until a machine-readable symbol is found or the full range of reading has been searched.

For small dynamic of reading range, the depth-of-field is considered constant and the focus increments are equally distributed over the full range of reading distances. For large reading distances, (e.g., extending to infinity), the number of image to acquire can be minimized by distributing the focus increments with progressive values to reflect the nonlinear progression of the depth-of-field from near field to far field (depth-of-field(z)/2). In any case, the number of images acquired is bounded as the hyperfocal distance defines the maximum focus distance.

Figure 8:
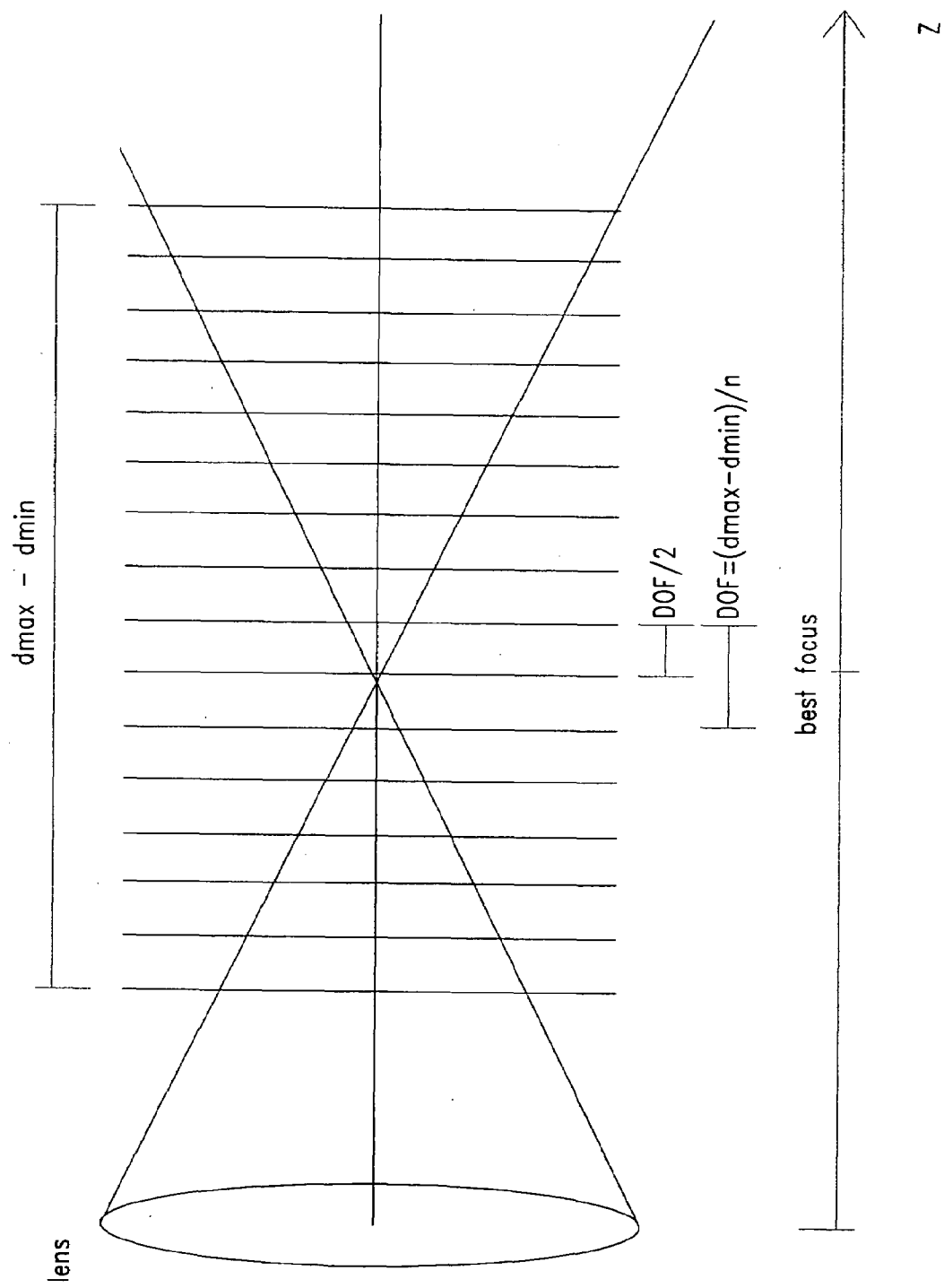
FIG. 8 is another schematic illustration of a search space and a number of equally distanced incremental focal points for the microfluidic lens assembly similar to FIG. 7 and further illustrating a best focus.
Figure 9:
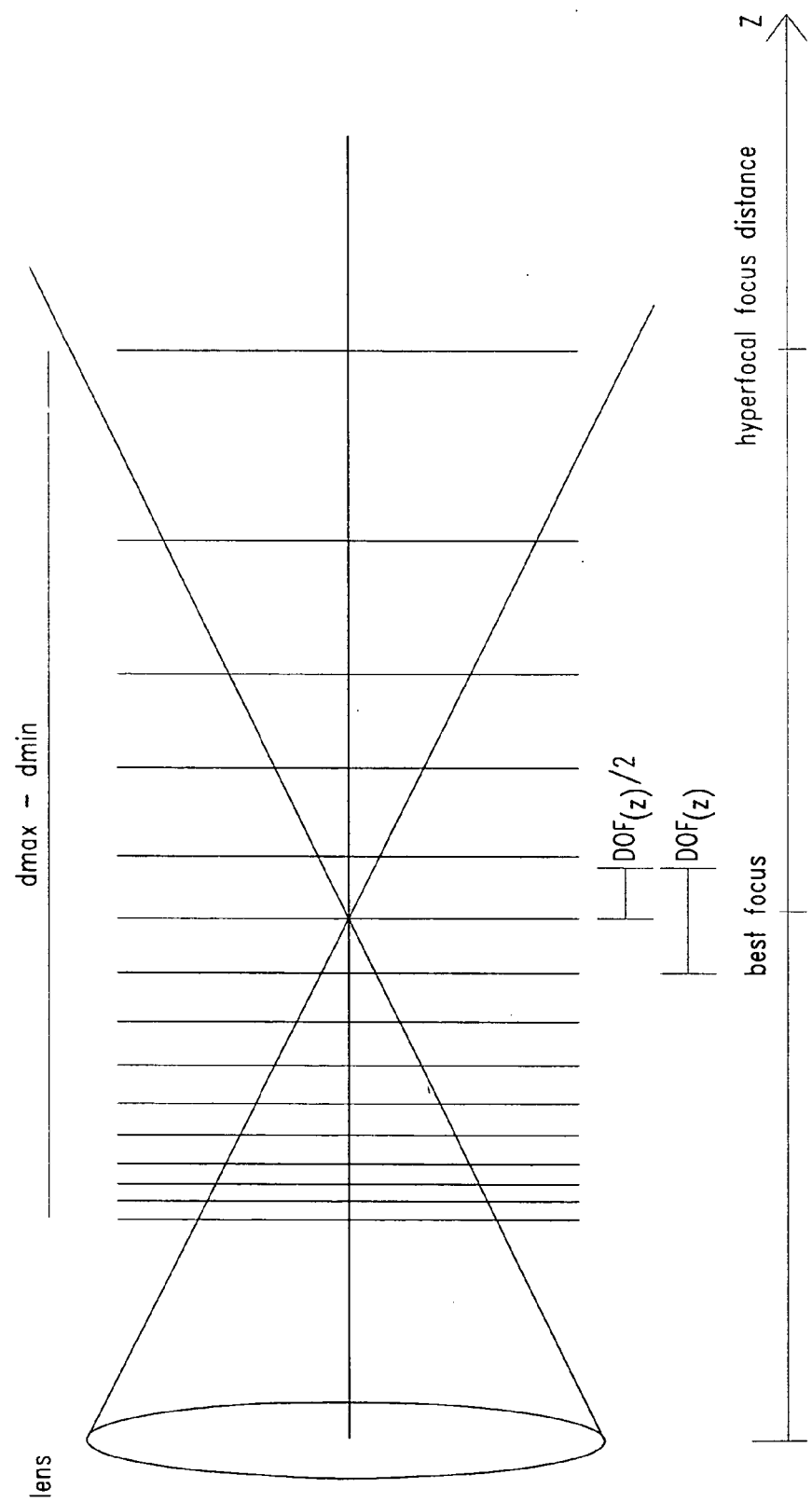
FIG. 9 is another schematic illustration of a search space and a number of non-linearly distanced incremental focal points for the microfluidic lens assembly.

The focus is incrementally moved over the full reading range, until at least one machine-readable symbol is detected. The absence of wear on parts, fast focus response, silent operation and/or low current draw of the electrowetted lens assembly 16 permits remaining in search mode (i.e., focus moving back-and-forth) without being limited by time. FIG. 8 illustrates an equal distribution of focus increments, while FIG. 9 illustrates a non-linear distribution of focus increments.

4. Symbol Localization

4.1 Image activity map

Figures 10, 11:
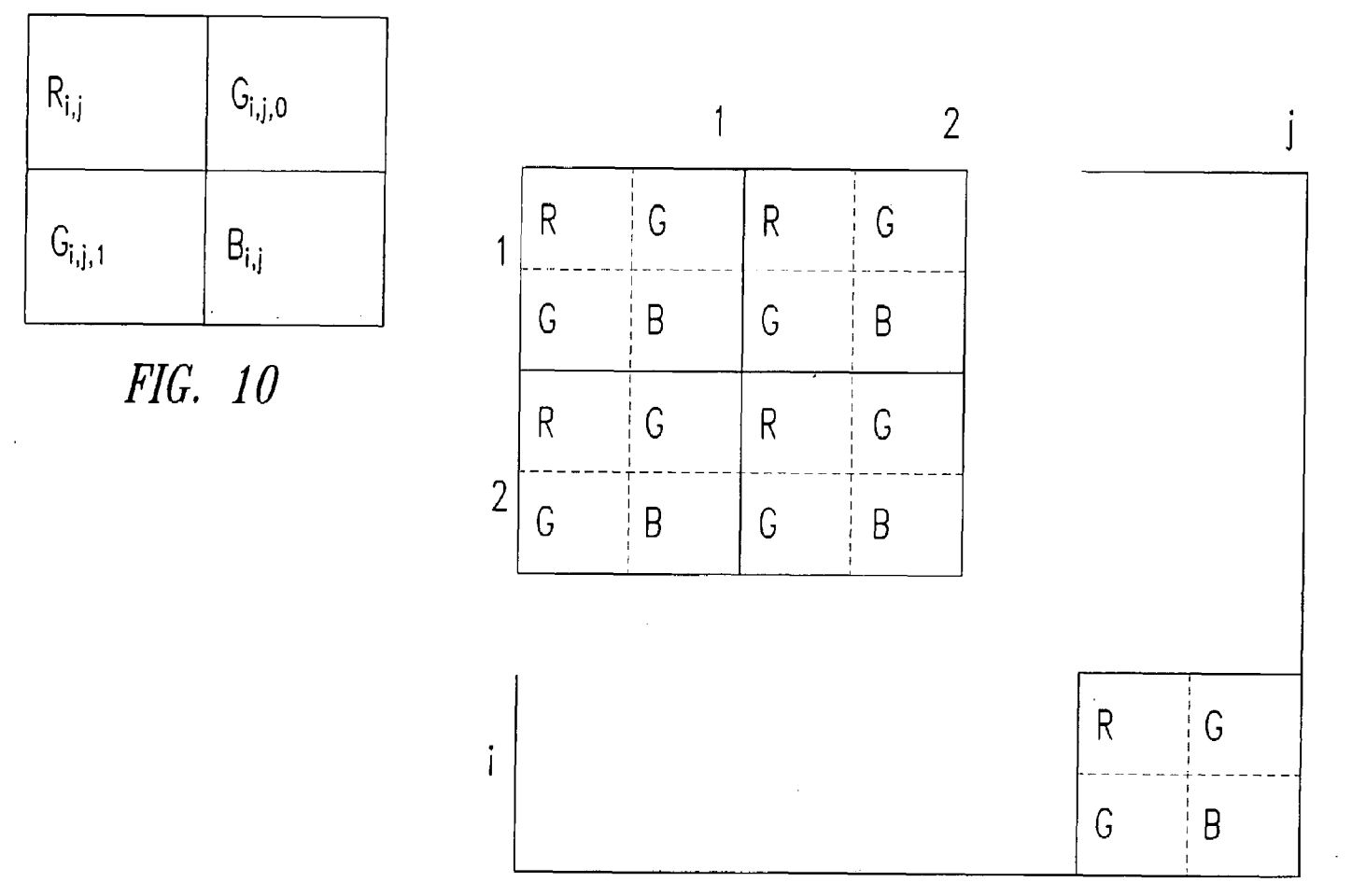

FIG. 10 shows a Bayer colored filter array, which is one of the most widely employed color filters in the field of imaging. The Bayer colored filter array may be described as a matrix of Filter Elements (FE) of four pixels, each FE comprising 2 green pixels in diagonal, one red pixel and one blue pixel.

Figure 12:
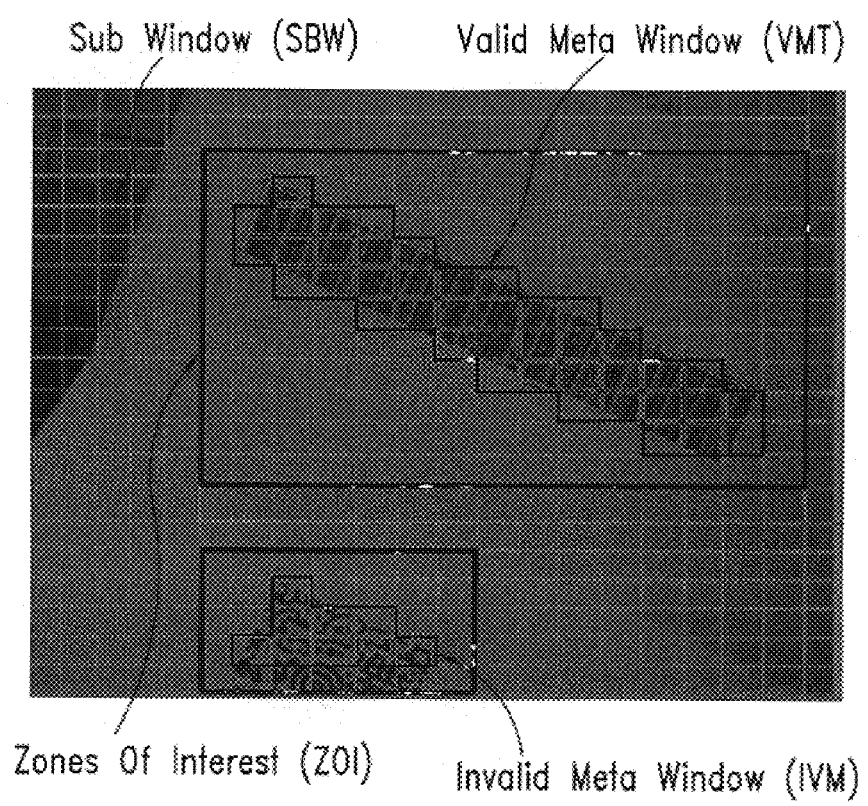
FIG. 12 is a schematic diagram of an image of a machine-readable symbol, the image being divided into sub-windows and a meta-window, illustrated by phantom lines, similar to that of FIG. 5.

As illustrated in FIG. 12, the image may then be decomposed into a matrix of elementary sub-windows 204, of equal size, each containing an integer number of FE (e.g. 32×24 pixels with a 4/3 format).

The activity of the image of the sub-windows 204 is measured by calculating the Sum Modulus Difference in every sub-window 204.

The SMD measurement can, for example, be limited to the green channel which is a good approximation of the overall luminance of the machine-readable symbol, although the signal/noise ratio and wavelength coverage may be enhanced by adding together the three separately determined SMD values (e.g., $SMD_R$, $SMD_G$, and $SMD_B$, corresponding to the Red, Green and Blue channels, respectively).

For each of the sub-windows 204, a total $SMD_{total}$ may be determined as follows:

$$SMD_G = \sum_i \sum_j |G_{(i,j,0)} - G_{(i,j,1)}| + |G_{(i,j,0)} - G_{(i,j+1,1)}|$$

$$SMD_R = \sum_i \sum_j |R_{(i,j)} - R_{(i,j+1)}| + |R_{(i+1,j)} - R_{(i,j)}|$$

$$SMD_B = \sum_i \sum_j |B_{(i,j)} - B_{(i,j+1)}| + |B_{(i+1,j)} - B_{(i,j)}|$$

$$SMD_{total} = SMD_R + SMD_G + SMD_R$$

4.2 Aggregating the Sub-windows into Valid Meta Windows

As further illustrated in FIG. 12, Once obtained an image mapped with SMD Values, adjacent sub-windows 204 having near SMD values are aggregated into meta windows 206.

The meta windows 206 are sorted into valid and invalid meta windows according to criteria of size, shape and average SMD value, parameters corresponding to a likelihood that the meta window 206 encompasses a machine-readable symbol.

Valid meta windows (VMT) are selected for fine focus according to their respective SMD value, size, shape, location in the image and/or eventually feedback from decoding functions.

In addition to provide specific areas where image sharpness should be maximized, symbol localization function defines or identifies zones-of-interest, to be transferred to the decoding functions. This early symbol pre-identification function reduces the amount of data to transfer for decoding, which may be particularly advantageous when using large format sensors.

5. Focus Mode

The average SMD values of the sub-windows 204 comprising the valid meta window(s) 206 represent the focus of the machine-readable symbol. The outer sub-windows 204 partially overlapping the machine-readable symbol may be discarded to improve accuracy. The average SMD is monotonic with the focus distance and presents a maximum when the machine-readable symbol is at best focus. The SMD determination does not require multiplication or a multiplier, and thus can be easily implemented by software or hardware in real time.

Other focus measurement can alternatively be used, e.g., the energy of the image (gray level variance), the high pass frequency content (image gradient, image Laplacian), the histogram entropy or local variation.

Conventional focus metrics present a maximum at best focus, but differ in performances, monotonicity, robustness to noise, and/or computational cost. One possible advantage of the SMD approach is that it can be implemented simply in hardware, or software, and may be used also for localizing one-dimensional machine-readable symbols.

Once in focus mode, incremental focus changes (e.g., depth-of-field/2) are applied again in the same direction, until the focus measurement decreases significantly for the first time. As in the search mode, the focus distance increments are equally or nonlinearly distributed over the full range of operation (e.g., $d_{min}$ to $d_{max}$), and are typically less than approximately half value of the depth-of-field (e.g., depth-of-field(z)/2). The maximum hyperfocal distance gives the maximum focus distance.

Figure 13:
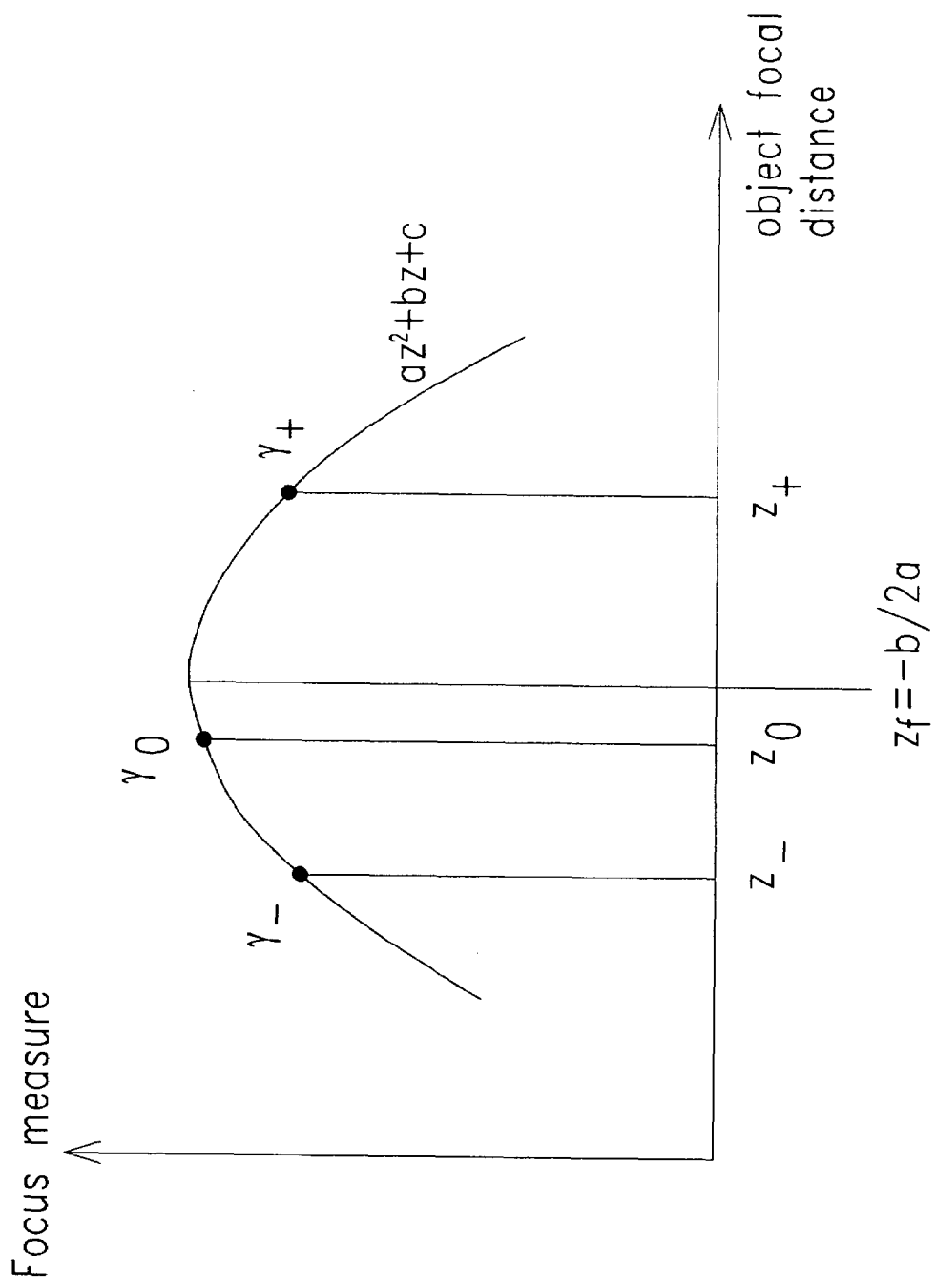
FIG. 13 is schematic illustration of quadratic interpolation according to one illustrated embodiment.

Once the focus measurement decreases significantly, a quadratic polynomial or a Gaussian curve is fitted to three or more points apart the best focus to interpolate the best focus position. A quadratic interpolation is illustrated in FIG. 13.

Three SMD values are sufficient to calculate the b and c coefficients, as well as the final potential to be applied to the microfluidic lens assembly 15 where f(−b/2a).

Depth-from-defocus algorithms that estimate the focus command to apply directly from one or several images may be used for slow focus actuation to help minimize the overshoot beyond the best focus position. Details of depth-from-focus algorithms are discussed in Tse-Chung Wei, *Three dimensional Machine Vision Using Image Defocus*, State University Of New York.

However using a fast micro-fluidic lens assembly 16 permits taking a distinctly different approach, where the best focus is purposely overshot to get an SMD value differences well above the noise measurement. The focus is then finely and quickly adjusted back to the interpolated position using the responsive (i.e., fast) microfluidic focus actuation.

If the SMD value of the a current valid meta window differs significantly from that of a previous one's, the algorithm returns to the search mode as the machine-readable symbol is moved to fast or even removed. The amount of change triggering a return to search mode may simply be a proportion of the previous SMD value.

6. Reduced Image Processing Bandwidth with Early Symbol Localization

Early localization of machine-readable symbols reduces the amount of data that is transferred to the host application. This approach is particularly beneficial when using high-resolution CCD/CMOS sensors.

Further, multi-resolution image states (e.g., wavelet bank filter, Laplacian pyramid or other compression scheme) can be applied to the identified zone-of-interest and further reduce the computational bandwidth of the imaging application.

7. Analog Zoom Control

Finally the zone of interest deduced from the selected meta window 206 may also be used to trim the power of an optical zoom. This is particularly advantageous for aim-and-read operations.

8. Enhancement of the Auto-Focus and the Decoding Spatial Resolution

The focus measurement proposed above is based on Sum Modulus Difference. As discussed, the SMD are first calculated over the three RGB channels separately, and then added to reduce the signal/noise ratio and to cover the full wavelength spectrum of the optical sensor 14. However, using the RGB channel separately is equivalent to sub sampling the image and thus implies some loss of resolution.

Many demosaicing algorithms exist to overcome the display artifacts that result from CFA sub-sampling, such as blurry edges and/or false coloring. These demosaicing algorithms fill missing color values using more or less complex interpolation and correlation rules between each channel. However, these algorithms if they minimize display artifacts, do not restore the destroyed resolution due to the CFA sub sampling.

In an alternative approached proposed herein the raw data of the optical sensor 14 is normalized to exploit the bi-luminance feature of machine-readable symbols and the fact that most of the cases, machine-readable symbols irradiance presents three RGB color components. Examples of such machine-readable symbols include black and white symbols, such machine-readable symbols formed as dark elements on light colored background symbols, or vice versa.

This approach may significantly enhance the focus accuracy and the decoding resolution of the machine-readable symbols using the optical sensor 14 at its maximum spatial resolution (1/pixel width).

For that purpose, once delimited the area of the symbol (VMT), the response of the three RGB channels are normalized as follows:

a) the variances of the R,G, B pixels are calculated over the valid meta window 206 according to:

$$\sigma_B = \frac{1}{n_B}\sum (B_{(n)} - \overline{B})^2 \quad \sigma_R = \frac{1}{n_R}\sum (R_{(n)} - \overline{R})^2 \quad \sigma_G = \frac{1}{n_G}\sum (G_{(n)} - \overline{G})^2$$

where $\overline{B}, \overline{R}, \overline{G}$ are the mean of the B,R and G pixels in the valid meta window 206.

b) the R,G,B pixel amplitude of the zone-of-interest comprising the machine-readable symbol are weighted in inverse proportion to the square root of the R, G, B channel variance, according to:

$$b_{(i,j)} = B_{(i,j)}/\sqrt{\sigma_B}, \; r_{(i,j)} = R_{(i,j)}/\sqrt{\sigma_R}, \; g_{(i,j)} = g_{(i,j)}/\sqrt{\sigma_G},$$

where $n_B$, $n_R$, $n_G$ are the number of Red, Green and Blue Pixel in the valid meta window 206.

The normalization of the pixel amplitudes provide a seamless signal that can be sampled up to the sensor Nyquist frequency.

Figure 14:
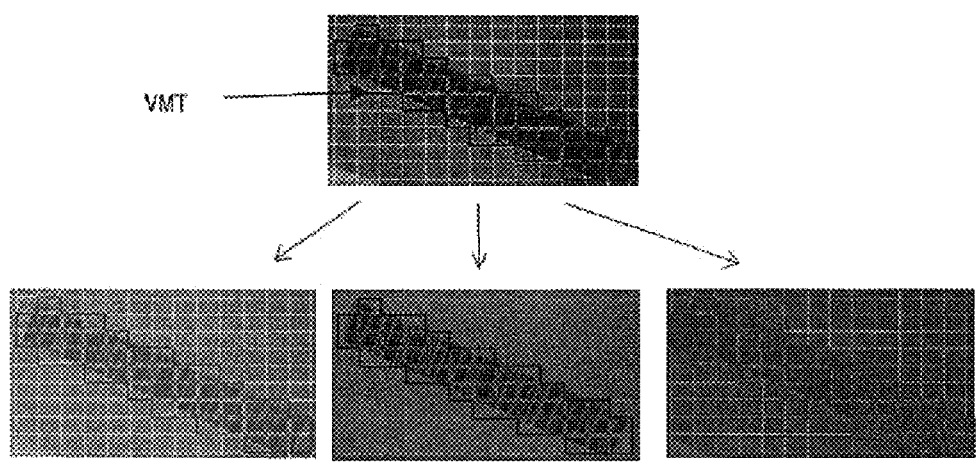
FIG. 14 schematic diagram is illustrating a decomposition of a gray level image into three RGB images.

FIG. 14 shows a machine-readable symbol with a contrast irradiance of the containing Red, Green, and Red wavelength components. With matching optical sensor sensitivity and symbol irradiance spectrums, the photo-converted signal is substantially seamless and could thus be sampled at the Nyquist frequency. Indeed, mismatches between the spectrums of the sensor sensitivity and the symbol irradiance induce discontinuities between RGB outputs. These discontinuities may be corrected by calibrating the RGB responsiveness for every code (i.e., symbology) read by calculating the variance (e.g., energy) of the meta window 206 in each RGB channels and normalizing the RGB pixels in inverse squared proportion.

An RGB channel with a calculated variance below a minimum value (or a proportion of the highest channel variance) may be discarded and its pixel values interpolated from the neighbour pixels. In this case, the decoding and auto-focus is carried out in a reduced resolution mode.

The enhancement introduces at the focus stage, once the symbols are localized, a normalization stage of the RGB pixels of the zone of interest. The SMD calculation of focus measurement is carried out at the pixel frequency regardless of the R G or B channel, instead of separate RGB calculation of the SMD and addition. The algorithms becomes:

Reset reading success, break, symbol localized
get image
do until reading success or break
  Search mode
    do until symbol localized
      focus=focus+Δfocus modulus($d_{min}$−$d_{max}$)
      get image
      search for symbol
      if symbol then set symbol localized
    end do until
  Focus mode
    do while symbol localized
      Normalise RGB channel
      transfer zone of interest (full resolution exploitable)
      focus measurement (full resolution)
      update focus get image
search for symbol
If not symbol then reset symbol localized
end do until Thus, combining symbol localization and focus control allows the focusing of images likely containing machine-readable symbols. This reduces the overall time for reading machine-readable symbols by avoiding miss-focusing on irrelevant objects. As discussed above, the fast, silent, low power variable focus microfluidic lens assembly 16 allows searching for machine-readable symbols without unnecessary time limitations. For example, using an 'aim-and-read' ergonomic, the coarse focus (symbol search) can be achieved during the 'aim phase' and fine focus during the 'read phase' when the operator depress the reading key. Thus, early localization of the machine-readable symbol constitutes a simple low or no loss alternative to compression algorithms by defining the zone-of-interest of the image to transfer, and thus to reduce the transmission and computational load. Additionally, the zone-of-interest can be used to early adjust the magnification of an analog zoom when adapted to hand held devices. Early location of the machine-readable symbol allows delivery of an image with equalized RGB channels that can to be sampled and exploited up to the Nyquist frequency of the sensor, enhancing the decoding resolution and the focus accuracy.

Some abbreviations used in the figures and description include the following:
AF: Auto Focus
DOF: Depth Of Field
MT: Meta Window
RGB: Reg Green Blue
SBW: Sub Window
SMD: Sum-Modulus-difference
IVT: Invalid Meta Window
VMT: Valid Meta Window
ZOI: Zone Of Interest Although specific embodiments of and examples for the machine-readable symbol reader 10 and method of operating the same are described herein for illustrative purposes, various equivalent modifications can be made without departing from the spirit and scope of the invention, as will be recognized by those skilled in the relevant art. The teachings provided herein of the invention can be applied to readers for any machine-readable symbology, not necessarily the exemplary bar code reader generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Pat. Nos. 5,574,598; 6,464,363; 6,347,742; Vdovin, et. al. *Micromachined Mirror With A Variable Focal Distance In Free-Space Microoptical Systems*, Digest of EOS Topical Meeting, pp. 28-29, Apr. 1-3 1996; Love, G. D., *Adaptive Optical Components Using Liquid Crystal Devices*, Journal of the Communications Research Laboratory, Vol. 46 No. 3, November 1999, pp. 427-430; *Electrocapillarite et mouillage de films isolants par l'eau* Berge, C. R. Acad. Sci. Paris, serial II, pp. 157-163; Boreman, D., *Modulation Transfer Function in Optical and Electro-Optical Systems*, SPIE Press; Chern, *Practical Issues in Pixel-Based Autofocusing for Machine Vision*, Proceedings of the 2001 IEEE International Conference on Robotics and Automation, Seoul, Korea, May 21-26, 2001, pp. 2791-2796; Ng Kuang Chern, et al., *Practical Issues In Pixel-Bases Autofocusing For Machine Vision*, Proceedings of the 2001 IEEE International Conference on Robotics & Automation; Subbarao et al., *Focusing Technique*, OE/Technology '92, SPIE Conference, Boston; Kerkyra, Proceedings of International Conference On Computer Vision, pp 834-838 (Kerkyra, 1999); Subbarao, M., *Focusing Technique*, Journal of Optical Engineering, Vol. 32, No. 11, pp 2824-2836 (November 1993); M. Subbarao, *Proceedings of SPIE's international symposium*, Videometrics IV, Vol. 2598, pp. 89-99; Tse-Chung Wei, *Three Dimensional Machine Vision Using Image Defocus*, State University of New York, Stonybrook; M. Subbarao, *Proceeding of SPIE 's International Symposium*, Videometrics IV, Vol. 2598, pp 89-99; Keren, *Restoring Sub-sampled Color Images*, Machine Vision and Applications (1999); Marino, *Improving the Performance of Single Chip Image Capture Devices*, Journal of Electronic Imaging 12(2), 209-218 (April 2003); and Ramanath, *Demosaicking methods for Bayer color arrays*, Journal of Electronic Imaging 11(3), 306-315 are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all machine-readable symbol readers and optical systems that operated in accordance with the claims. Accordingly, the invention is not limited by the disclosure, but instead its scope is to be determined entirely by the following claims.

The invention claimed is:

1. A machine-readable symbol reader to read machine-readable symbols carried by targets, the machine-readable symbol reader comprising:
a microfluidic lens assembly having at least one first fluid and a number of electrodes selectively operable to modify a shape of the at least one first fluid;
an optical sensor positioned along an optical axis of the microfluidic lens assembly relatively behind the microfluidic lens assembly with respect to the target;
at least one controller, the controller coupled to cause a selected potential to be applied to at least some of the electrodes of the microfluidic lens assembly to focus images of the target on the optical sensor; and
wherein the focal characteristics of the microfluidic lens assembly are controlled by application of pre-selected electrical fields to a second fluid surrounding the first fluid, where the first and the second fluids are immiscible with respect to one another, the second fluid is a conductor and the first fluid is an insulator.

2. The machine-readable symbol reader of claim 1, further comprising:
a range finder system positioned to assess a distance between the microfluidic lens assembly and the target.

3. The machine-readable symbol reader of claim 1, further comprising:
a range finder system positioned to assess a distance between the microfluidic lens assembly and the target, wherein the at least one controller is coupled to receive range finding information from the range finder system and configured to adjust a focal length of the microfluidic lens assembly based on the range finding information.

4. The machine-readable symbol reader of claim 1, further comprising:
a range finder system positioned to assess a distance between the microfluidic lens assembly and the target, wherein the at least one controller is coupled to receive range finding information from the range finder system and configured to determine a focal length for the microfluidic lens assembly based on the determined focal range.

5. The machine-readable symbol reader of claim 1, further comprising:
a range finder system positioned to assess a distance between the microfluidic lens assembly and the target, the range finder system comprising a range finder output device selectively operable to produce an output in a defined frequency range in an electromagnetic spectrum and a range finder input device sensitive in the defined frequency range of the electromagnetic spectrum.

6. The machine-readable symbol reader of claim 1, further comprising:
a range finder system positioned to assess a distance between the microfluidic lens assembly and the target, the range finder system comprising a range finder output device selectively operable to produce an output pressure pulse in a defined frequency range and a range finder input device sensitive to pressure pulses in the defined frequency range.

7. The machine-readable symbol reader of claim 1, wherein the microfluidic lens assembly comprises a single optical interface element.

8. The machine-readable symbol reader of claim 1, further comprising:
an illumination system, the illumination sources selectively actuatable to produce different intensities of illumination.

9. The machine-readable symbol reader of claim 1, further comprising:
an illumination system comprising a number of illumination sources, where the controller is configured to determine a desired intensity of illumination and coupled to selectively activated a number of the illumination sources to produce desired intensity of illumination.

10. The machine-readable symbol reader of claim 1, further comprising:
a color filter assembly positioned between the target and the optical sensor.

11. The machine-readable symbol reader of claim 1, further comprising:
a Bayer color filter assembly positioned between the target and the optical sensor.

12. A method of operating a machine-readable symbol reader to read machine-readable symbols carried by targets, the method comprising:
determining a distance between a microfluidic lens assembly of the machine readable symbol reader and the target;
adjusting a focal length of the microfluidic lens assembly based on the determined distance to the target, wherein adjusting a focal length of the microfluidic lens assembly includes:
applying a first potential to at least one of a number of electrodes spaced from a substantially non-conducting fluid by a dielectric; and
applying a second potential to a substantially conducting fluid surrounding the first fluid, where the non-conducting fluid and the conducting fluid are immiscible with respect to one another;
capturing an image of a machine-readable symbol carried by the target; and
decoding the machine-readable symbol carried by the target.

13. The method of claim 12 wherein adjusting a focal length of the microfluidic lens assembly includes applying a potential to at least one of a number of electrodes.

14. The method of claim 12 wherein capturing an image of a machine-readable symbol carried by the target includes electronically scanning an optical sensor positioned along an optical axis of the microfluidic lens assembly relatively behind the microfluidic lens assembly with respect to the target.

15. The method of claim 12 wherein determining a distance between a microfluidic lens assembly of the machine readable symbol reader and the target includes emitting energy in a defined range of an electromagnetic spectrum toward the target, and receiving energy in the defined range of the electromagnetic spectrum reflected from the target.

16. The method of claim 12 wherein determining a distance between a microfluidic lens assembly of the machine readable symbol reader and the target includes emitting pressure pulses a defined range of frequencies toward the target, and receiving pressure pulses in the defined range of frequencies reflected from the target.

17. The method of claim 12, further comprising:
adjusting an output intensity of an illumination system of the machine-readable symbol reader based on at least one of the determined distance between the microfluidic lens assembly and the target and the focal length of the microfluidic lens assembly.

18. The method of claim 12, further comprising:
minimizing an output intensity of an illumination system of the machine-readable symbol reader based on at least one of the determined distance between the microfluidic lens assembly and the target and the focal length of the microfluidic lens assembly.

19. The method of claim 12, further comprising:
identifying the target in an image before determining the distance between a microfluidic lens assembly of the machine readable symbol reader and the target.

20. The method of claim 19 wherein identifying the target in an image before determining the distance between a microfluidic lens assembly of the machine readable symbol reader and the target comprises:
determining a plurality of sub-windows of the image on which to operate;
determining a subtraction-modulus-difference value for each of a number pixels in horizontally adjacent ones of the sub-windows and for each of a number pixels in vertically adjacent ones of the sub-windows;
aggregating adjacent sub-windows having determined subtraction-modulus-difference values below a defined threshold into a meta window of the image on which to operate;
determining a focus value corresponding to a focus condition at an initial focal length of the microfluidic lens assembly;
adjusting the microfluidic lens assembly to a second focal length;
determining a focus value corresponding to a focus condition at the second focal length of the microfluidic lens assembly;

determining a direction of change in the determined focus values;
repeatedly, adjusting the microfluidic lens assembly at different incremental focal lengths in a space of the image along the same direction in the space, and
determining a focus value corresponding to a focus condition at the different incremental focal lengths until the focus value drops by more than a defined threshold; and
interpolating a best focus length from at least three of the focal lengths.

21. The method of claim 20, further comprising:
accumulating the subtraction-modulus-difference value for at least three different colors.

22. A method of operating a machine-readable symbol reader to read color encoded machine-readable symbols carried by targets, the method comprising:
acquiring an image through a three color filter at a single optical sensor;
determining a plurality of sub-windows of the image on which to operate;
for each of the colors, determining a subtraction-modulus-difference value for each of a number pixels in horizontally adjacent ones of the sub-windows and for each of a number pixels in vertically adjacent ones of the sub-windows;
accumulating the subtraction-modulus-difference value for each of at least three different colors;
aggregating adjacent sub-windows having accumulated subtraction-modulus-difference values below a defined threshold into a meta window of the image on which to operate;
determining a focus value corresponding to a focus condition at an initial focal length of the microfluidic lens assembly;
adjusting the microfluidic lens assembly to a second focal length;
determining a focus value corresponding to a focus condition at the second focal length of the microfluidic lens assembly;
determining a direction of change in the determined focus values;
repeatedly, adjusting the microfluidic lens assembly at different incremental focal lengths in a space of the image along the same direction in the space, and
determining a focus value corresponding to a focus condition at the different incremental focal lengths until the focus value drops by more than a defined threshold; and
interpolating a best focus length from at least three of the focal lengths.

23. The method of claim 22 wherein interpolating a best focus length from at least three of the focal lengths comprises a quadratic or a Gaussian interpolation.

24. A machine-readable symbol reader to read machine-readable symbols carried by targets, the machine-readable symbol reader comprising:
a microfluidic lens assembly having at least one first fluid and a number of electrodes selectively operable to modify a shape of the at least one first fluid;
an optical sensor positioned along an optical axis of the microfluidic lens assembly relatively behind the microfluidic lens assembly with respect to the target;
at least one controller, the controller coupled to cause a selected potential to be applied to at least some of the electrodes of the microfluidic lens assembly to focus images of the target on the optical sensor; and
wherein at least one optical interface element of the lens comprises a second fluid, the first and the second fluids being immiscible fluids of different optical indexes and of substantially same density with second fluid being substantially electrically-conductive and the first fluid being substantially electrically-non-conductive.

25. The machine-readable symbol reader of claim 24, further comprising:
a range finder system positioned to assess a distance between the microfluidic lens assembly and the target.

26. The machine-readable symbol reader of claim 24, further comprising:
a range finder system positioned to assess a distance between the microfluidic lens assembly and the target, wherein the at least one controller is coupled to receive range finding information from the range finder system and configured to adjust a focal length of the microfluidic lens assembly based on the range finding information.

27. The machine-readable symbol reader of claim 24, further comprising:
a range finder system positioned to assess a distance between the microfluidic lens assembly and the target, wherein the at least one controller is coupled to receive range finding information from the range finder system and configured to determine a focal length for the microfluidic lens assembly based on the determined focal range.

28. The machine-readable symbol reader of claim 24, further comprising:
a range finder system positioned to assess a distance between the microfluidic lens assembly and the target, the range finder system comprising a range finder output device selectively operable to produce an output in a defined frequency range in an electromagnetic spectrum and a range finder input device sensitive in the defined frequency range of the electromagnetic spectrum.

29. The machine-readable symbol reader of claim 24, further comprising:
a range finder system positioned to assess a distance between the microfluidic lens assembly and the target, the range finder system comprising a range finder output device selectively operable to produce an output pressure pulse in a defined frequency range and a range finder input device sensitive to pressure pulses in the defined frequency range.

30. The machine-readable symbol reader of claim 24, wherein the microfluidic lens assembly comprises a single optical interface element.

31. The machine-readable symbol reader of claim 24, further comprising:
an illumination system, the illumination sources selectively actuatable to produce different intensities of illumination.

32. The machine-readable symbol reader of claim 24, further comprising:
an illumination system comprising a number of illumination sources, where the controller is configured to determine a desired intensity of illumination and coupled to selectively activated a number of the illumination sources to produce desired intensity of illumination.

33. The machine-readable symbol reader of claim 24, further comprising:
a color filter assembly positioned between the target and the optical sensor.

34. The machine-readable symbol reader of claim 24, further comprising:

a Bayer color filter assembly positioned between the target and the optical sensor.

35. A method of operating a machine-readable symbol reader to read machine-readable symbols carried by targets, the method comprising:

determining a distance between a microfluidic lens assembly of the machine readable symbol reader and the target;

adjusting a focal length of the microfluidic lens assembly based on the determined distance to the target;

capturing an image of a machine-readable symbol carried by the target;

decoding the machine-readable symbol carried by the target; and identifying the target in an image before determining the distance between a microfluidic lens assembly of the machine readable symbol reader and the target, wherein identifying the target in an image before determining the distance between a microfluidic lens assembly of the machine readable symbol reader and the target includes:

determining a plurality of sub-windows of the image on which to operate;

determining a subtraction-modulus-difference value for each of a number pixels in horizontally adjacent ones of the sub-windows and for each of a number pixels in vertically adjacent ones of the sub-windows;

aggregating adjacent sub-windows having determined subtraction-modulus-difference values below a defined threshold into a meta window of the image on which to operate;

determining a focus value corresponding to a focus condition at an initial focal length of the microfluidic lens assembly;

adjusting the microfluidic lens assembly to a second focal length;

determining a focus value corresponding to a focus condition at the second focal length of the microfluidic lens assembly;

determining a direction of change in the determined focus values;

repeatedly, adjusting the microfluidic lens assembly at different incremental focal lengths in a space of the image along the same direction in the space, and determining a focus value corresponding to a focus condition at the different incremental focal lengths until the focus value drops by more than a defined threshold; and interpolating a best focus length from at least three of the focal lengths.

36. The method of claim 35 wherein adjusting a focal length of the microfluidic lens assembly includes applying a potential to at least one of a number of electrodes.

37. The method of claim 35 wherein adjusting a focal length of the microfluidic lens assembly includes applying a first potential to at least one of a number of electrodes spaced from a substantially non-conducting fluid by a dielectric, and applying a second potential to a substantially conducting fluid surrounding the first fluid, where the non-conducting fluid and the conducting fluid are immiscible with respect to one another.

38. The method of claim 35 wherein capturing an image of a machine-readable symbol carried by the target includes electronically scanning an optical sensor positioned along an optical axis of the microfluidic lens assembly relatively behind the microfluidic lens assembly with respect to the target.

39. The method of claim 35 wherein determining a distance between a microfluidic lens assembly of the machine readable symbol reader and the target includes emitting energy in a defined range of an electromagnetic spectrum toward the target, and receiving energy in the defined range of the electromagnetic spectrum reflected from the target.

40. The method of claim 35 wherein determining a distance between a microfluidic lens assembly of the machine readable symbol reader and the target includes emitting pressure pulses a defined range of frequencies toward the target, and receiving pressure pulses in the defined range of frequencies reflected from the target.

41. The method of claim 35, further comprising:

adjusting an output intensity of an illumination system of the machine-readable symbol reader based on at least one of the determined distance between the microfluidic lens assembly and the target and the focal length of the microfluidic lens assembly.

42. The method of claim 35, further comprising:

minimizing an output intensity of an illumination system of the machine-readable symbol reader based on at least one of the determined distance between the microfluidic lens assembly and the target and the focal length of the microfluidic lens assembly.

43. The method of claim 35, further comprising:

accumulating the subtraction-modulus-difference value for at least three different colors.

* * * * *